US012617055B2

(12) United States Patent
Ben Shmuel

(10) Patent No.: US 12,617,055 B2
(45) Date of Patent: May 5, 2026

(54) AUTOMATED DIAMOND POLISHING METHODS AND SYSTEMS

(71) Applicant: Zalirian Ltd., Ramat-Gan (IL)

(72) Inventor: Oded Ben Shmuel, Petach-Tikva (IL)

(73) Assignee: Zalirian Ltd., Ramat-Gan (IL)

( * ) Notice: Subject to any disclaimer, the term of this patent is extended or adjusted under 35 U.S.C. 154(b) by 630 days.

(21) Appl. No.: 17/438,987

(22) PCT Filed: Mar. 15, 2020

(86) PCT No.: PCT/IB2020/052352
§ 371 (c)(1),
(2) Date: Sep. 14, 2021

(87) PCT Pub. No.: WO2020/183440
PCT Pub. Date: Sep. 17, 2020

(65) Prior Publication Data

US 2022/0152772 A1 May 19, 2022

Related U.S. Application Data

(60) Provisional application No. 62/818,213, filed on Mar. 14, 2019.

(51) Int. Cl.
*B24B 9/16* (2006.01)
*B24B 27/00* (2006.01)
(Continued)

(52) U.S. Cl.
CPC .............. *B24B 9/167* (2013.01); *B24B 9/163* (2013.01); *B24B 27/0038* (2013.01);
(Continued)

(58) Field of Classification Search
CPC ........... B24B 9/167; B24B 9/163; B24B 9/16; B24B 9/168; B24B 27/0038;
(Continued)

(56) References Cited

U.S. PATENT DOCUMENTS 3,811,229 A 5/1974 Montgomery
4,143,544 A 3/1979 DeVries et al.
(Continued)

FOREIGN PATENT DOCUMENTS

CN 204019295 12/2014
CN 204019295 U * 12/2014
(Continued)

OTHER PUBLICATIONS

Office Action Dated Nov. 7, 2023 From the Israel Patent Office Re. Application No. 296337. (6 Pages).
(Continued)

*Primary Examiner* — Michael A Gump

(57) ABSTRACT

An automated gem polishing system comprising a computer-controlled polishing wheel; robotic apparatus, comprising multiple axis controllers and a gem holder; a digital microscope; and a computer having a processor and a memory, the memory including instructions that when executed by the processor implement the steps of registering and polishing a gem in the gem holder.

16 Claims, 22 Drawing Sheets

(51) Int. Cl.

| | |
|---|---|
| ***B24B 49/12*** | (2006.01) |
| ***B24B 49/14*** | (2006.01) |
| ***B24B 51/00*** | (2006.01) |
| ***B28D 5/00*** | (2006.01) |

(52) U.S. Cl.
CPC .............. *B24B 49/12* (2013.01); *B24B 49/14* (2013.01); *B24B 51/00* (2013.01); *B28D 5/00* (2013.01)

(58) Field of Classification Search
CPC .............. B24B 27/0015; B24B 27/003; B24B 27/0046; B24B 27/0069; B24B 27/0084; B24B 27/02; B24B 49/12; B24B 49/14; B24B 49/16; B24B 49/02; B24B 49/006; B24B 49/00; B24B 49/04; B24B 49/045; B24B 51/00; B24B 7/00; B24B 7/04; B24B 7/22; B24B 7/222; B24B 41/005; B24B 47/22; B28D 5/00; B28D 5/0058; B28D 5/0064
USPC ............................................................ 451/64
See application file for complete search history.

(56) References Cited

U.S. PATENT DOCUMENTS

| | | | | | |
|---|---|---|---|---|---|
| 4,864,778 | A | | 9/1989 | Smith | |
| 5,077,767 | A | | 12/1991 | Gaukroger | |
| 5,118,181 | A | | 6/1992 | Yifrach et al. | |
| 5,418,829 | A | | 5/1995 | Nagano | |
| 5,746,645 | A | * | 5/1998 | Beal | B23Q 15/013 451/41 |
| 5,816,896 | A | * | 10/1998 | Schouwenaars | B24B 49/12 451/10 |
| 10,131,033 | B2 | | 11/2018 | Maloney et al. | |
| 10,173,916 | B2 | | 1/2019 | Bankaitis et al. | |
| 11,904,433 | B2 | | 2/2024 | Sytenko | |
| 2002/0052170 | A1 | | 5/2002 | Holloway | |
| 2003/0096559 | A1 | | 5/2003 | Marshall | |
| 2003/0223054 | A1 | | 12/2003 | Warwick | |
| 2006/0070982 | A1 | | 4/2006 | Patel | |
| 2006/0102854 | A1 | | 5/2006 | Neogi et al. | |
| 2006/0227414 | A1 | * | 10/2006 | Hashimoto | G02B 21/248 359/368 |
| 2010/0055022 | A1 | | 3/2010 | Linares et al. | |
| 2012/0129432 | A1 | * | 5/2012 | Cloutier | B24B 37/02 451/5 |
| 2012/0274751 | A1 | * | 11/2012 | Smith | G01N 21/87 348/E5.029 |
| 2014/0067331 | A1 | * | 3/2014 | Benjano | A44C 27/00 703/1 |
| 2014/0235141 | A1 | | 8/2014 | Maloney et al. | |
| 2015/0165548 | A1 | | 6/2015 | Marjanovic et al. | |
| 2016/0004926 | A1 | * | 1/2016 | Kerner | G01N 21/87 348/46 |
| 2021/0129286 | A1 | | 5/2021 | Sivovolenko | |
| 2023/0100222 | A1 | | 3/2023 | Ben Shmuel et al. | |

FOREIGN PATENT DOCUMENTS

| | | | | | |
|---|---|---|---|---|---|
| CN | 104697998 | | | 6/2015 | |
| EP | 0313369 | | | 4/1989 | |
| GB | 2074480 | | | 11/1981 | |
| IN | 650/MUM/2005 | | | 4/2007 | |
| IN | 371455 | | | 2/2019 | |
| IN | 329868 | | | 3/2019 | |
| IN | 202027005999 | | | 2/2020 | |
| IN | 201821041909 | | | 8/2020 | |
| IN | 201821041911 | | | 8/2020 | |
| JP | 6-7239 | | | 1/1994 | |
| JP | 2020163478 | A | * | 10/2020 | |
| WO | WO 02/10091 | | | 2/2002 | |
| WO | WO 03/099054 | | | 12/2003 | |
| WO | WO 2004/105999 | | | 12/2004 | |
| WO | WO 2006/087702 | | | 8/2006 | |
| WO | WO-2006087702 | A1 | * | 8/2006 | A44C 17/001 |
| WO | WO-2012176219 | A2 | * | 12/2012 | A44C 27/00 |
| WO | WO 2018/085608 | | | 5/2018 | |
| WO | WO 2018/178517 | | | 10/2018 | |
| WO | WO-2018178517 | A1 | * | 10/2018 | G01N 21/87 |
| WO | WO 2018/235328 | | | 12/2018 | |
| WO | WO 2019/042850 | | | 3/2019 | |
| WO | WO 2019/043488 | | | 3/2019 | |
| WO | WO-2019042850 | A1 | * | 3/2019 | B24B 49/12 |
| WO | WO 2020/161638 | | | 8/2020 | |
| WO | WO 2020/183440 | | | 9/2020 | |
| WO | WO 2021/181397 | | | 9/2021 | |

OTHER PUBLICATIONS

Exhibit A "WO 2020/183440", p. 30-85.
Exhibit A "WO 2021/181397", p. 46-105.
Exhibit E "U.S. Pat. No. 2012/0274751", p. 214-230.
Exhibit F "PCT WO 2018/085608A2", (59 Pages).
Exhibit F "WO 2004/105999A1", p. 245-284.
Exhibit G "PCT WO 2018/178517A1", (51 Pages).
Exhibit G "US 2003/0223054", p. 285-301.
Exhibit H "US 2010/0055022", p. 302-307.
Supplementary European Search Report and the European Search Opinion Dated Oct. 25, 2022 From the European Patent Office Re. Application No. 20769458.9.(8 pages).
Pre-Grant Opposition Filed by M/s Sahajanand Technologies Private Limited Against Indian Patent Application No. 202127043158 Titled Automated Diamond Polishing Methods and Systems in the Name of Zalirian Ltd. Dated Sep. 19, 2023 to the Indian Patent Office Re. Application No. 202127043158. (41 Pages).
Pre-Grant Opposition Filed by Sahajanand Technologies Private Limited Against Indian Patent Application No. 202227055686 Titled Automated Apparatus and Method for Object Faceting in the Name of Zalirian Ltd. Dated Sep. 19, 2023 to the Indian Patent Office Re. Application No. 202227055686. (57 Pages).
Office Action Dated Mar. 11, 2024 From the Israel Patent Office Re. Application No. 296337. (4 Pages).
Supplementary European Search Report and the European Search Opinion Dated Apr. 12, 2024 From the European Patent Office Re. Application No. 21766889.6. (8 Pages).
International Preliminary Report on Patentability Dated Sep. 22, 2022 From the International Bureau of WIPO Re. Application No. PCT/IB2021/050272. (10 Pages).
International Preliminary Report on Patentability Dated Sep. 23, 2021 From the International Bureau of WIPO Re. Application No. PCT/IB2020/052352. (19 Pages).
International Search Report and the Written Opinion Dated Jul. 21, 2020 From the International Searching Authority Re. Application No. PCT/IB2020/052352. (27 Pages).
International Search Report and the Written Opinion Dated Jun. 29, 2021 From the International Searching Authority Re. Application No. PCT/IB2021/050272 . . . (16 Pages).
Barankov et al. "Single-Exposure Profilometry Using Partitioned Aperture Wavefront Imaging", ArXiv Preprint ArXiv:1307.5267v1, p. 1-4, Jul. 19, 2013.
Examination Report Under Sections 12 & 13 of the Patents Act, 1970 and the Patents Rules, 2003 Dated Aug. 2, 2023 From the Government of India, Intellectual Property India, Patents, Designs, Trade Marks, Geographical Indications, The Patent Office Re. Application No. 202127043158. (6 pages).
Restriction Official Action Dated Nov. 22, 2024 from the US Patent and Trademark Office Re. U.S. Appl. No. 17/910,839. (7 pages).
Official Action Dated Feb. 27, 2025 from the US Patent and Trademark Office Re. U.S. Appl. No. 17/910,839. (64 pages).
Office Action Dated Aug. 5, 2024 From the Israel Patent Office Re. Application No. 286379. (3 Pages).
Examination Report Dated Jun. 13, 2024 From the African Regional Intellectual Property Organization (ARIPO) Re. Application No. AP/P/2022/014360. (5 pages).

(56) References Cited

OTHER PUBLICATIONS

Communication Pursuant to Article 94(3) EPC Dated Jun. 25, 2024 From the European Patent Office Re. Application No. 20769458.9 (4 Pages).
Pre-Grant Opposition Against Patent Application Dated Nov. 4, 2024 Re. Application No. IN 202127043158. (367 Pages) (Part 1).
Pre-Grant Opposition Against Patent Application Dated Nov. 4, 2024 Re. Application No. IN 202127043158. (367 Pages) (Part 2).
Notification of Office Action and Search report Dated May 20, 2025 From the State Intellectual Property Office of the People's Republic of China Re. Application No. 202180024923.9 and Its Machine Translation and Summary in English (34 Pages).
Official Action Dated Sep. 15, 2025 from the US Patent and Trademark Office Re. U.S. Appl. No. 17/910,839. (31 pages).
Merriam-Webster "NPL1, Definition of Raw", Merriam-Webster, pp. 1, Available Jan. 6, 2017.
Examination Report Under Sections 12 & 13 of the Patents Act, 1970 and the Patents Rules, 2003 Dated Mar. 9, 2026 From the Government of India, Intellectual Property India, Patents, Designs, Trade Marks, Geographical Indications, The Patent Office Re. Application No. 202227055686. (12 pages).

* cited by examiner

AUTOMATED DIAMOND POLISHING METHODS AND SYSTEMS

RELATED APPLICATIONS

This application is a National Phase of PCT Patent Application No. PCT/IB2020/052352 having International filing date of Mar. 15, 2020, which claims the benefit of priority under 35 USC § 119 (e) of U.S. Provisional Patent Application No. 62/818,213 filed on Mar. 14, 2019. The contents of the above applications are all is incorporated by reference as if fully set forth herein in their entirety.

FIELD AND BACKGROUND OF THE INVENTION

The invention generally relates to gem polishing and grading, and in particular to automation of polishing and grading tasks.

The process of polishing a rough diamond to create a finished gem involves multiple iterative steps. In general, these steps require a high degree of manual intervention, resulting in a time consuming and expensive process.

Computer methods are known for assisting in planning the polishing of a rough diamond; for example, computer graphics may be used to plan a final, target gem, that is, the gem that will be created by the polishing process. However, after the plan is in place, the subsequent polishing process, by which each facet of the gem is cut and polished, generally requires repeated human intervention. High temperatures can affect the precision of mechanical parts of the grinding equipment. In addition, the polishing process may introduce "artifacts," such as pits, scratches, polishing lines, etc., into the gem surface. Polishing is therefore stopped frequently to correct polishing deviations and facet flaws. Automation to reduce human intervention could reduce costs and delays.

SUMMARY OF THE INVENTION

Embodiments of the present invention provide methods and systems for automating the steps of gem polishing and polish grading.

According to an aspect of some embodiments of the present invention there is provided an automated gem polishing system comprises: a computer-controlled polishing wheel; a robotic apparatus, comprises multiple axis controllers and a gem holder; a digital microscope; and a computer having a processor and a memory, the memory including instructions that when executed by the processor implement steps of registering and polishing a gem in the gem holder by: operating the robotic apparatus to move the gem to a field of view (FOV) of the digital microscope, to position the gem in multiple views with respect to the digital microscope, and to receive from the digital microscope multiple respective images of the gem; generating from the multiple respective images a current 3D model of the gem; registering coordinates of the current 3D model with a target 3D model of a finished gem; selecting a current facet of the gem to polish in order to achieve the target 3D model; determining an optimal polishing direction of the current facet; and operating the robotic apparatus to move the current facet into contact with the polishing wheel, and operating the polishing wheel to polish the current facet, in the optimal polishing direction; wherein the gem has a crystal structure defined by three orthogonal crystallographic axes, wherein the optimal polishing direction is one of the three crystallographic axes or a projection thereof onto the current facet, and wherein the robotic apparatus is configured to rotate the current facet on the polishing wheel into the optimal polishing direction.

According to some embodiments of the invention the system wherein the polishing wheel has an adjustable, computer-controlled speed.

According to some embodiments of the invention the determining the optimal polishing direction of the current facet is based on previously determined polishing directions of other facets.

According to some embodiments of the invention registering coordinates of the 3D model of the gem with a target 3D model further comprises registering the current 3D model of the gem with respect to a known position of the holder.

According to some embodiments of the invention operating the polishing wheel to polish the current facet comprises operating the polishing wheel at a speed and duration determined by predefined rules.

According to some embodiments of the invention a selection of the predefined rules is determined according to artifacts on the current facet.

According to some embodiments of the invention operating the robotic apparatus to move the current facet to contact the polishing wheel further comprises operating the robotic apparatus to position the current facet in contact with the polishing wheel on a polishing wheel track and at a pressure determined by predefined rules.

According to some embodiments of the invention the instructions also cause the processor to select at least one of a polishing speed, duration, track and pressure according to the optimal polishing direction of the current facet.

According to some embodiments of the invention the instructions also cause the processor to select at least one of a polishing speed, duration, track and pressure according to artifacts determined by analyzing an image of the polished surface after a polishing interval.

According to some embodiments of the invention the instructions also cause the processor to grade the gem by analyzing an image received from the digital microscope after a polishing interval.

According to some embodiments of the invention the instructions also cause the processor to operate the robotic apparatus to move the current facet after polishing to the field of view of the digital microscope; to optically determine a tilt of the gem holder, responsively adjusting the tilt; to subsequently generate a 2D image of the current facet; and to responsively create a new current 3D model having a new facet conforming to dimensions of the 2D image of the facet.

According to some embodiments of the invention the instructions also cause the processor to classify an artifact appearing in the 2D facet image, and, responsively to the artifact classification and the new current 3D model, to determine one or more control settings of the robotic apparatus for further polishing of the facet, wherein the control settings include holder tilt, polishing speed, duration, track and pressure.

According to some embodiments of the invention moving the gem to the field of view (FOV) of the digital microscope comprises automatically selecting a lens of the digital microscope according to a size of the gem.

According to some embodiments of the invention the memory also includes instructions that when executed by the processor implement steps of selecting polishing parameters of the gem in the gem holder by: operating the robotic apparatus to move the gem to the FOV of the digital microscope; receiving an image corresponding to a view of the current facet from the digital microscope; processing the image corresponding to the view of the current facet by an artifact recognition algorithm trained to recognize a set of surface artifacts correlated to a set of subsequent polishing parameters; identifying at least one surface artifact of the current facet and determining that no correlated set of polishing parameters exists; issuing an alert to a human operator to determine a set of polishing parameters.

According to some embodiments of the invention the memory also includes instructions that when executed by the processor implement steps of controlling the polishing wheel, the robotic apparatus, and the digital microscope to determine a polish status of the gem in the gem holder by: operating the robotic apparatus to move the current facet of the gem into contact with the polishing wheel, and operating the polishing wheel to polish the current facet according to a set of polishing parameters; subsequently moving the gem to the FOV of the digital microscope; receiving an image corresponding to a view of the current facet recorded by the digital microscope; registering the image corresponding to the view of the current facet to the current 3D model to determine a depth of polishing; responsively determining that dimensions of the gem equal the dimensions of the target 3D model and that the polishing of the gem is complete.

According to some embodiments of the invention the instructions to cause the processor to grade the gem include: to move the gem to the FOV of the digital microscope; to receive an image corresponding to a view of the current facet recorded by the digital microscope; to register the image corresponding to the view of the current facet to the current 3D model to determine a depth of polishing, wherein the current 3D model is registered to the target 3D model and to responsively determine that dimensions of the gem equal the dimensions of the target 3D model and that the polishing of the gem is complete; to position the gem in multiple views with respect to the digital microscope, to receive from the digital microscope multiple respective images of multiple facets of the gem; to responsively determine, for each of the multiple facets, artifacts of the multiple facets; and to grade the gem by determining a polish grade of the gem according to preset correlations between facet artifacts and polish grades.

BRIEF DESCRIPTION OF THE SEVERAL VIEWS OF THE DRAWINGS

For a better understanding of various embodiments of the invention and to show how the same may be carried into effect, reference is made, by way of example, to the accompanying drawings. Structural details of the invention are shown to provide a fundamental understanding of the invention, the description, taken with the drawings, making apparent to those skilled in the art how the several forms of the invention may be embodied in practice. In the accompanying drawings.

DESCRIPTION OF SPECIFIC EMBODIMENTS OF THE INVENTION

Figure 1:
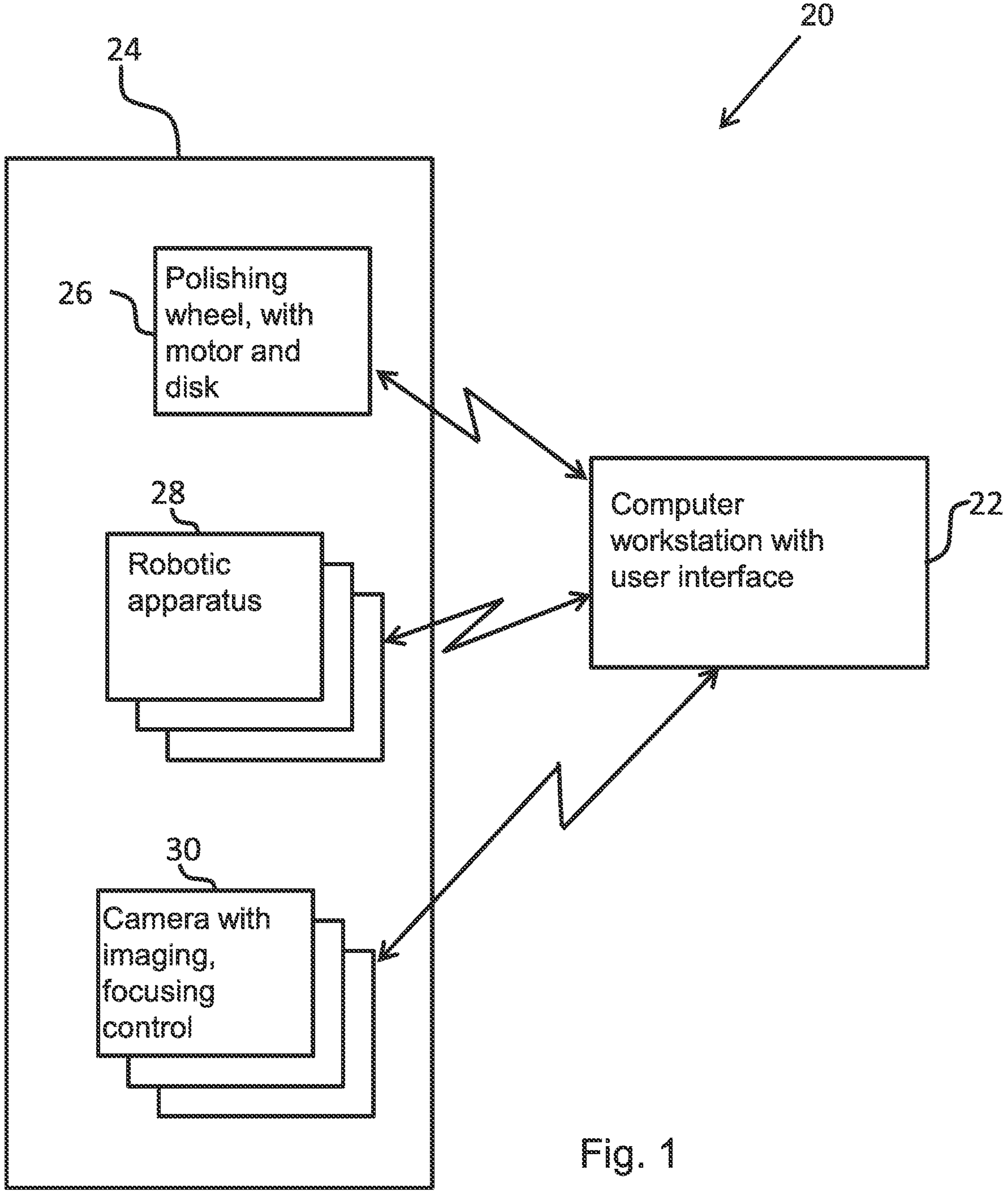
FIG. 1 is a schematic diagram of a system for automated polishing and grading of gems, according to some embodiments of the present invention.

It is to be understood that the invention and its application are not limited to the methods and systems described below or to the arrangement of the components set forth or illustrated in the drawings, but are applicable to other embodiments that may be practiced or carried out in various ways.

FIG. 1 is a schematic diagram of a system 20 for automated polishing and grading of gems, and of diamonds in particular, according to some embodiments of the present invention. Although reference is made herein primarily to diamond polishing, the systems and methods provided herein have applicability to polishing and grading of all gems, particularly fine gems, and particularly those with hardness on the Mohs scale of 9 and greater (diamond having a Mohs scale index of 10). Hereinbelow, the terms diamond, gem, and diamond gem are used interchangeably. A rough diamond or rough gem refers to a gem that is unfinished, that is, a gem that needs further polishing before it can be considered a finished gem.

The system 20 includes a computer 22, which may be a programmable device with a processor, typically with a user interface, such as a desktop workstation or laptop computer, or other mobile device. Alternatively, computer 22 may be an embedded computer, integrated into one of the other elements of system 20. The computer controls elements of polishing apparatus 24. These elements including a computer-controlled polishing, or lapping, table 26, robotic apparatus 28, and an imaging module 30. The robotic apparatus 28 typically includes four or more axes, each axis being controlled by a robotic motor, also referred to hereinbelow as an axis controller. The imaging module 30 is typically an inverted microscope with a digital camera. Being a microscope, the imaging module 30 typically has a shallow depth of field (DOF), and has one or more illumination lights providing front "dark field" illumination and/or "bright field" illumination. In further embodiments, the microscope is alternatively or additionally configured with directional illumination, whereby a ring of LEDs, spaced at, for example, 10 degree increments around the 360 degree circumference, illuminate the gem at an angle. The LEDs may also be individually controlled, such that illumination may be provided from individual, angled beams of light. Lens magnification factors that range from five to ten times are typical. In some embodiments, the system is configured to support a range of magnifications from 1× to 20×, typically with multiple lens. As an "inverted" microscope, objects under observation are above, rather than below, the camera aperture.

The imaging module 30 typically is configured to provide a live digital video stream of images of a gem under observation to the computer 22, which analyzes facets of the gem, as described further hereinbelow.

Figure 2:
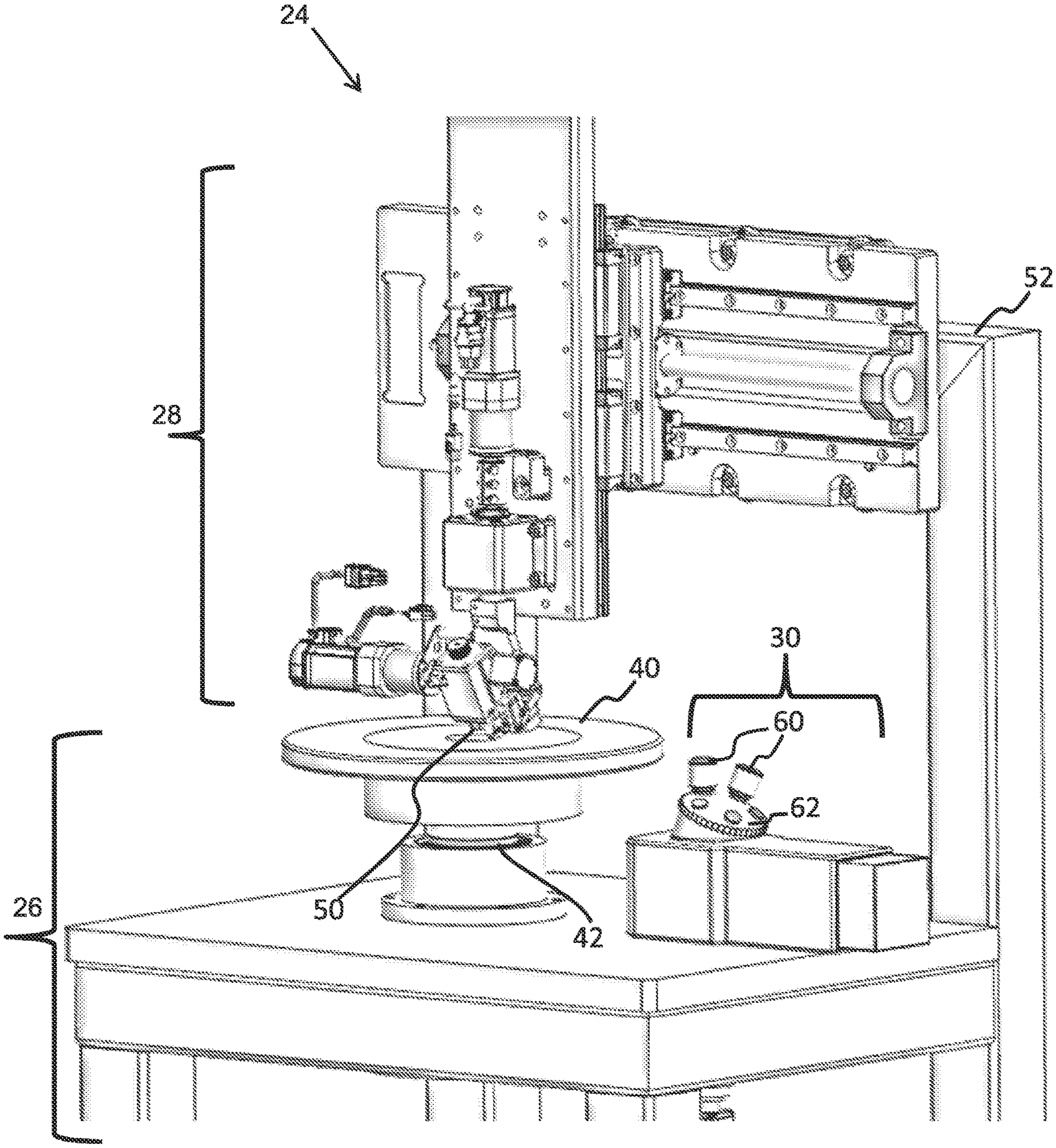
FIG. 2 is a schematic illustration of apparatus for automated polishing and grading of gems, according to some embodiments of the present invention.

FIG. 2 is a schematic illustration of the polishing apparatus 24, according to some embodiments of the present invention. Polishing apparatus 24 typically includes a frame 104, including a table 106 onto which the other elements of the apparatus are mounted.

The polishing table 26 of the polishing apparatus includes a polishing surface, such as a disk or wheel 40. Typically polishing wheel 40 includes multiple tracks having different abrasive characteristics, ranging from course to very fine. Additional elements of the polishing table 26 may include a computer-controlled motor 42, which controls the rotational speed of the wheel 40, as well as a computer-controlled brake (not shown).

The robotic apparatus 28 of the polishing apparatus includes multiple axes of movement, described further with respect to FIG. 4 below, as well as a gem holder 50 configured to hold a gem against the wheel 40, as described below with respect to FIG. 4. The robotic apparatus may be supported above the polishing table 26 by a frame 52, which is connected to the polishing table.

Also shown in the figure is the imaging module 30 which includes one or more selectable lenses 60 and a lens selector 62, which is typically a servo motor. Elements of the imaging module 30 are described further hereinbelow, with respect to FIG. 7.

Figure 3:
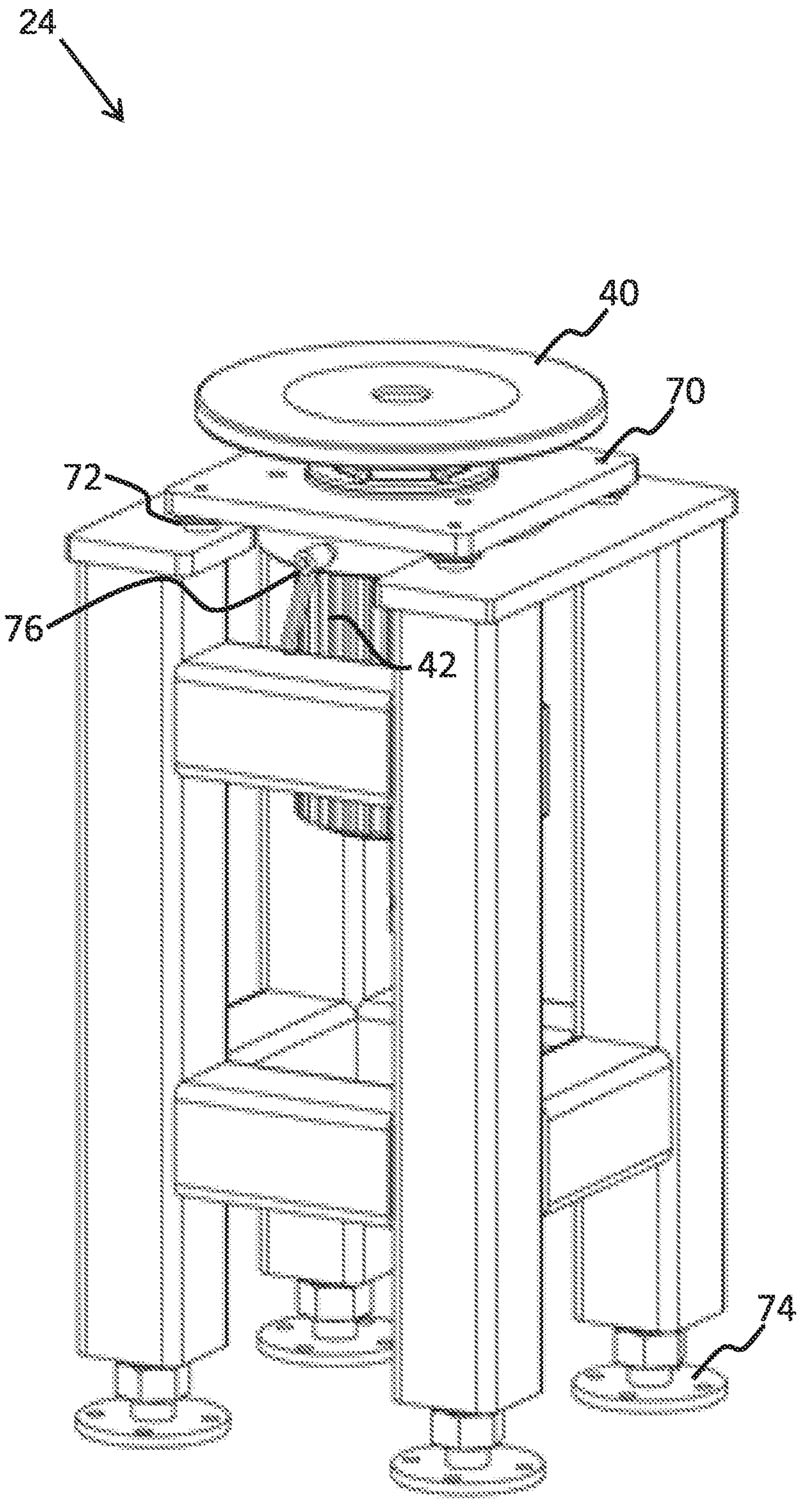
FIGS. 3, 4, 5, 6, 7, 8, 9*a-c* and 10*a-c* are a-further schematic illustrations of the apparatus for automated polishing and grading of gems, according to some embodiments of the present invention.

FIG. 3 is a schematic illustration of the polishing table 26, according to some embodiments of the present invention. Shown are the polishing wheel 40 and the polishing motor 42 described above. Also shown are some of the additional features of the polishing table, including a balance plate 70, with balance shims 72, adjustable leg supports 74, and a mechanical height adjustment knob 76.

Figure 4:
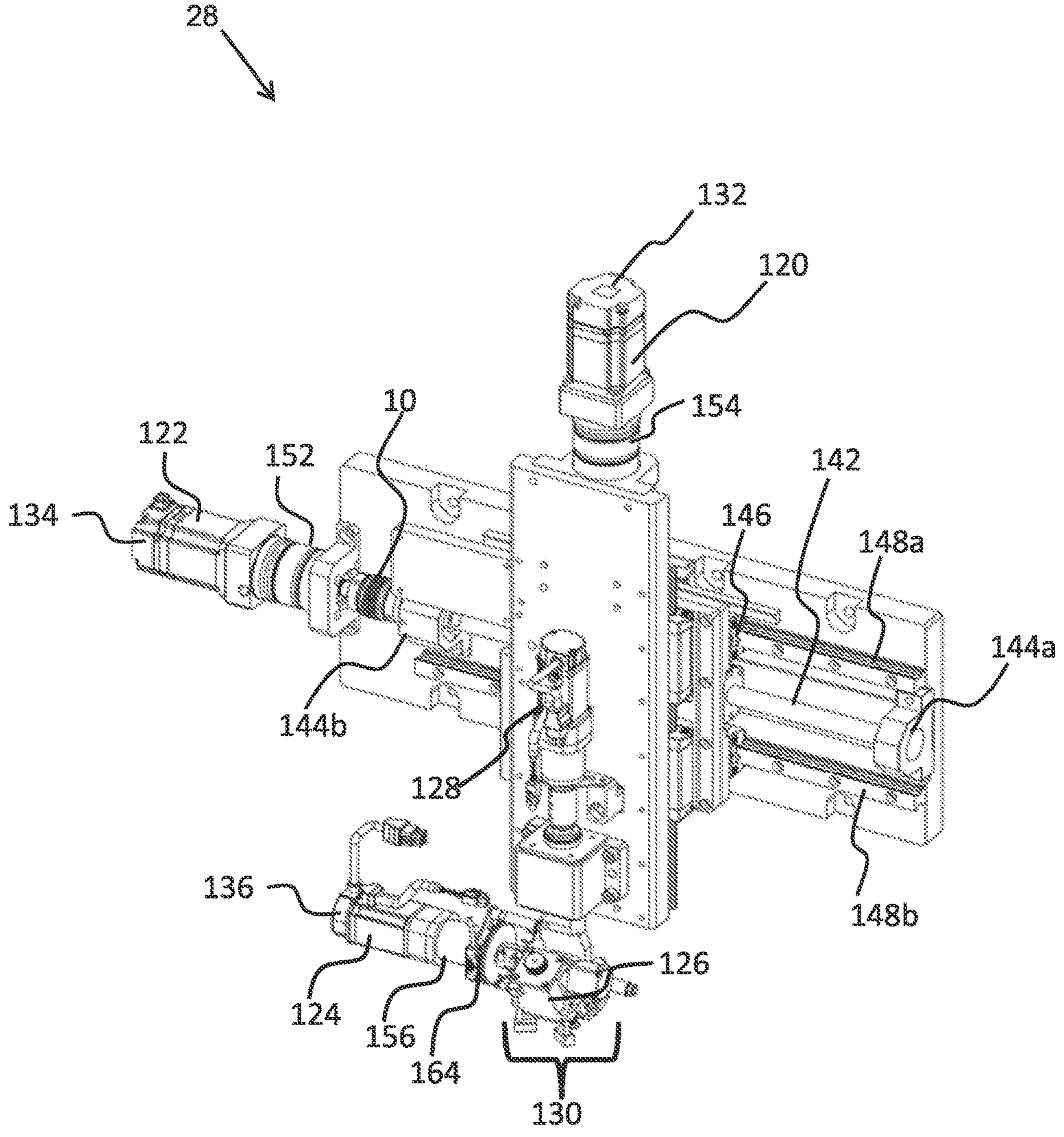

FIG. 4 is a schematic illustration of the robotic apparatus 28, according to some embodiments of the present invention. The robotic apparatus 28 typically includes multiple positioning motors, each controlling corresponding axes of movement. Motors may be servo or stepping motors, or other similarly accurate positioning controllers.

Five such controllers are indicated in the figure. These are a vertical axis (z-axis) controller 120, a horizontal axis (x-axis) controller 122, a tilt controller 124, rotary holder controller 126, and a rotary wheel-orientation controller 128. The vertical axis controller 120 controls movement of a gem downwards against the polishing wheel 40 and upwards from the polishing wheel, as well as controlling a force of downward pressure of the gem against the polishing wheel. The horizontal axis controller 122 controls movement of a gem to a selected track of the polishing wheel 40, along the x-axis of the robotic apparatus. The horizontal axis controller 122 also moves the gem to a position within a field of view (FOV) of the imaging module 30. The tilt controller 124 controls a tilt of a gem in its holder. The rotary holder (or "facet rotation") controller 126 rotates a gem holder (described below) so that the desired facet of the gem is against the polishing wheel, at the tilt set by the tilt controller. The rotary holder controller is part of the rotary holder mechanism 130, described further hereinbelow with respect to FIG. 5.

The rotary wheel-orientation controller 128 pivots the gem so that to change the orientation of a facet with respect to the polishing wheel, so that the direction of polishing can be changed.

It is to be understood that the naming of the various axis controllers of the robotic arm is used only as a means of reference and that other designations could be applied. Furthermore, other configurations of robotic arms may also be implemented having fewer or more axis controllers.

The controllers typically include encoders that provide movement measurements to the computer. For example, the robotic apparatus may include a vertical axis linear encoder 132, a horizontal axis linear encoder 134, and a tilt axis encoder 136, as well as rotary holder and wheel-orientation encoders (not indicated).

The horizontal and vertical axis controllers may control the movement of ball screw mechanisms. A horizontal ball screw 142 may be connected to horizontal pillow blocks 144*a* and 144*b*. A ball runner block 146 of the horizontal axis may be guided along guide rails 148*a* and 148*b*. The vertical axis may have similar pillow blocks, guide rails, and runner block (not shown). The accuracy of the axis controllers is typically enhanced by planetary gears. For the horizontal and vertical axes, these gears are indicated as respective gears 152 and 154. A tilt axis planetary gear is indicated as tilt gear 156. To further improve measurement of axis positions, additional plate encoders may be added, such as the tilt axis plat encoder 164.

Figure 5:
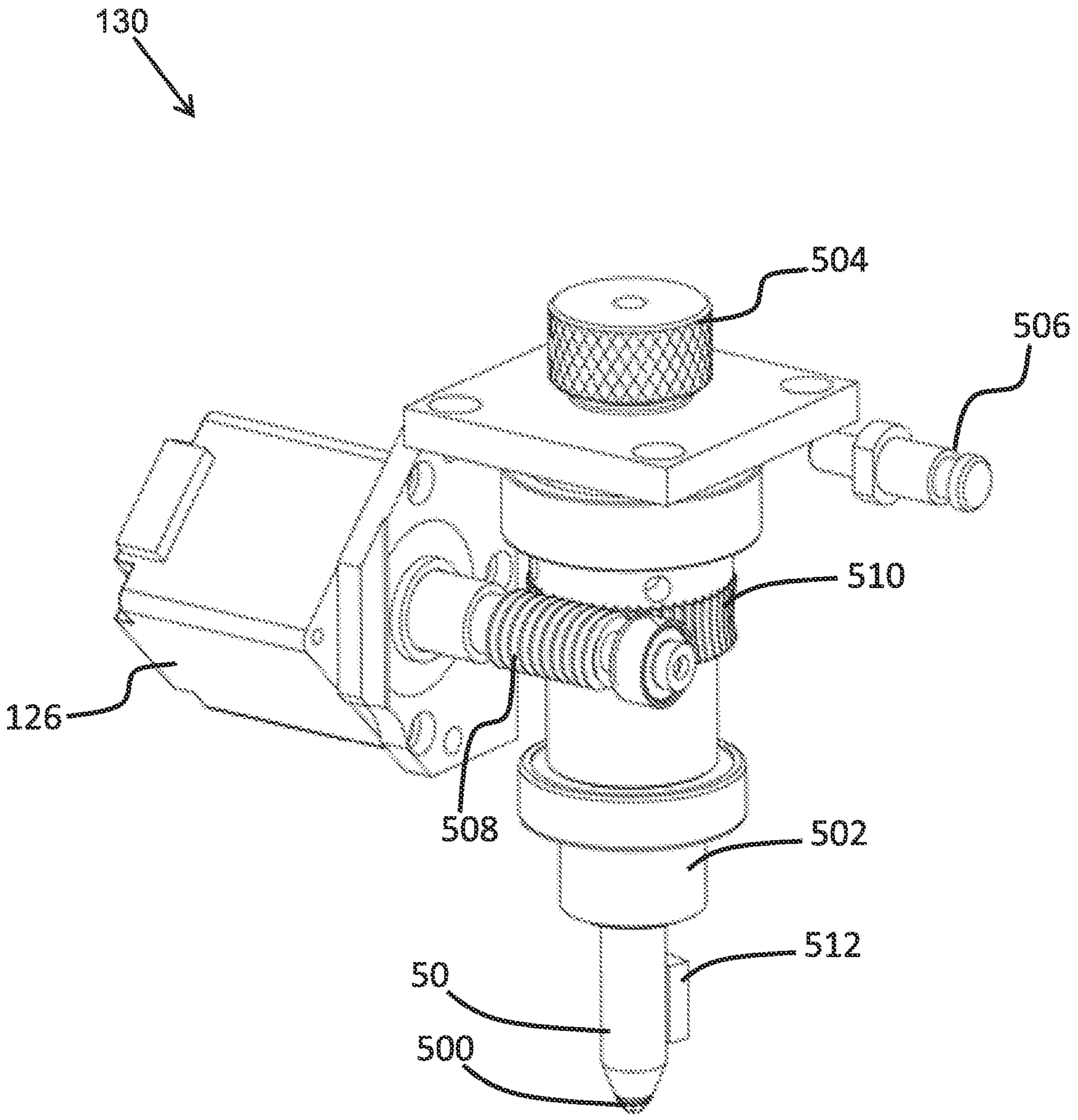

FIG. 5 is a schematic illustration of a close-up of the rotary holder mechanism 130, according to some embodiments of the present invention. Shown in the figure is of the rotary holder controller 126, at the tip of which is a gem holder 50, holding a gem 500. The gem holder 50 prevents slippage of the gem, despite the forces generated by the polishing process. Typically the gem holder is manually removable from its position in the apparatus, so that a gem can be easily positioned in the gem holder. The gem holder with the gem in place is then mounted into position in a mount 502 of the rotary holder controller 28 before polishing begins.

A holder mount lock 504 may be employed to ensure that the holder position does not move within the rotary holder mechanism 130. A backlash coupler 506 may provide mechanical vibration damping in conjunction with a coupling mechanism such as a spring, shown hereinbelow with respect to FIG. 6. The backlash coupler may dampen vibrations of the holder, as well as reduce backlash that would otherwise occur due to friction against the polishing wheel, as the polishing wheel accelerates and decelerates. Additional damper springs may be added to other axes, as well.

Also shown in FIG. 5 is the rotary holder motor 126 described above, as well as a worm screw 508 and worm wheel 510, which impart rotational movement to the holder. Also shown is a holder temperature sensor 512, which generates an electrical signal indicative of the temperature of the holder during polishing. Friction of polishing can cause a significant temperature rise.

Figure 6:
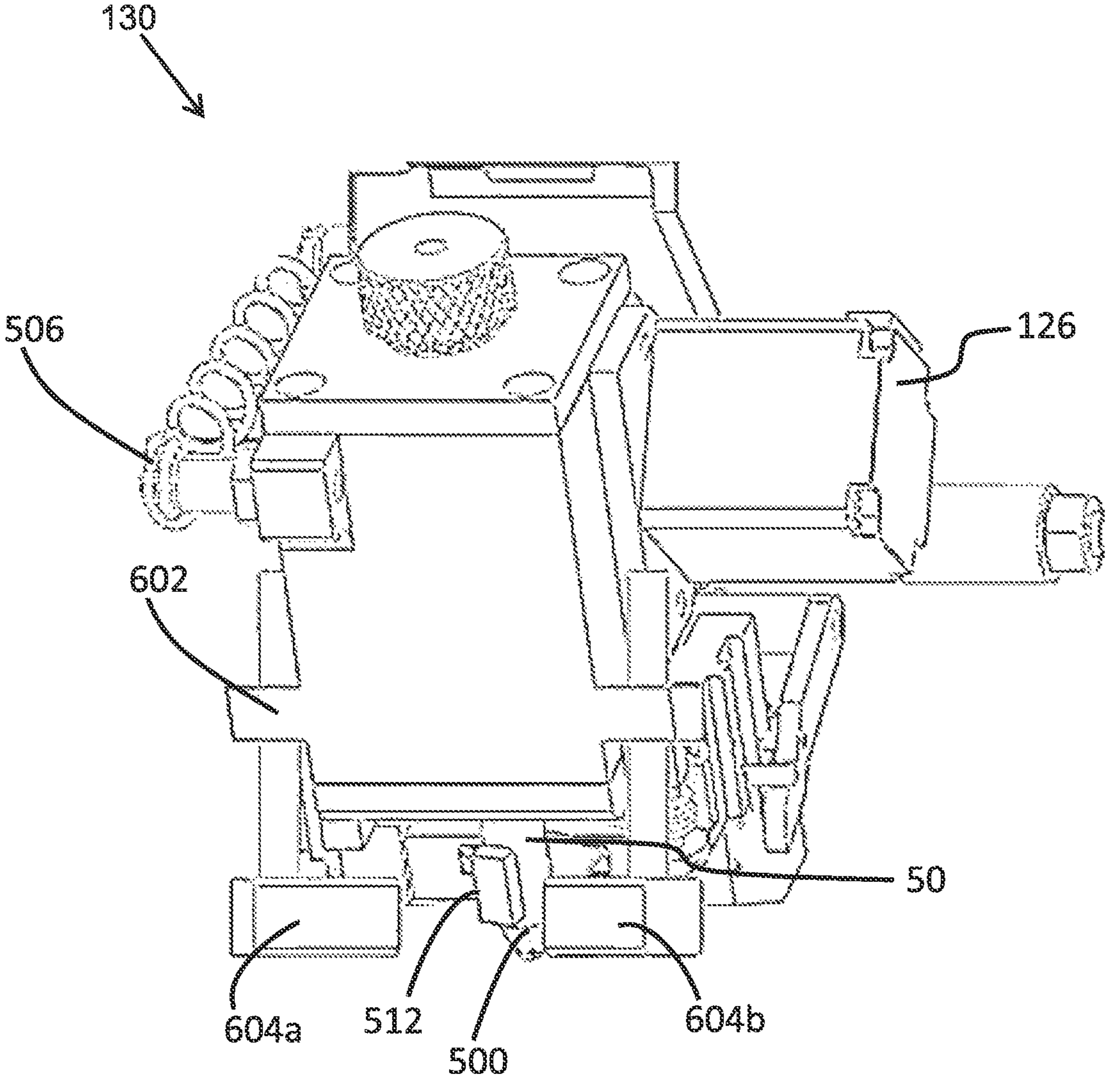

FIG. 6 is a schematic illustration of a back side view of the rotary holder mechanism 130, according to some embodiments of the present invention. Shown in the figure are the rotary holder controller 126, and the gem holder 50, holding the gem 500. Also shown are the temperature sensor 512 and a second view of the backlash coupler 506. Also shown is a warm gear case 602 protecting the worm gear and wheel mechanism described above with respect to FIG. 5, as well as infrared thermometers 604*a* and 604*b*, which may measure the temperature of the gem 500 and/or the gem holder 50.

Figure 7:
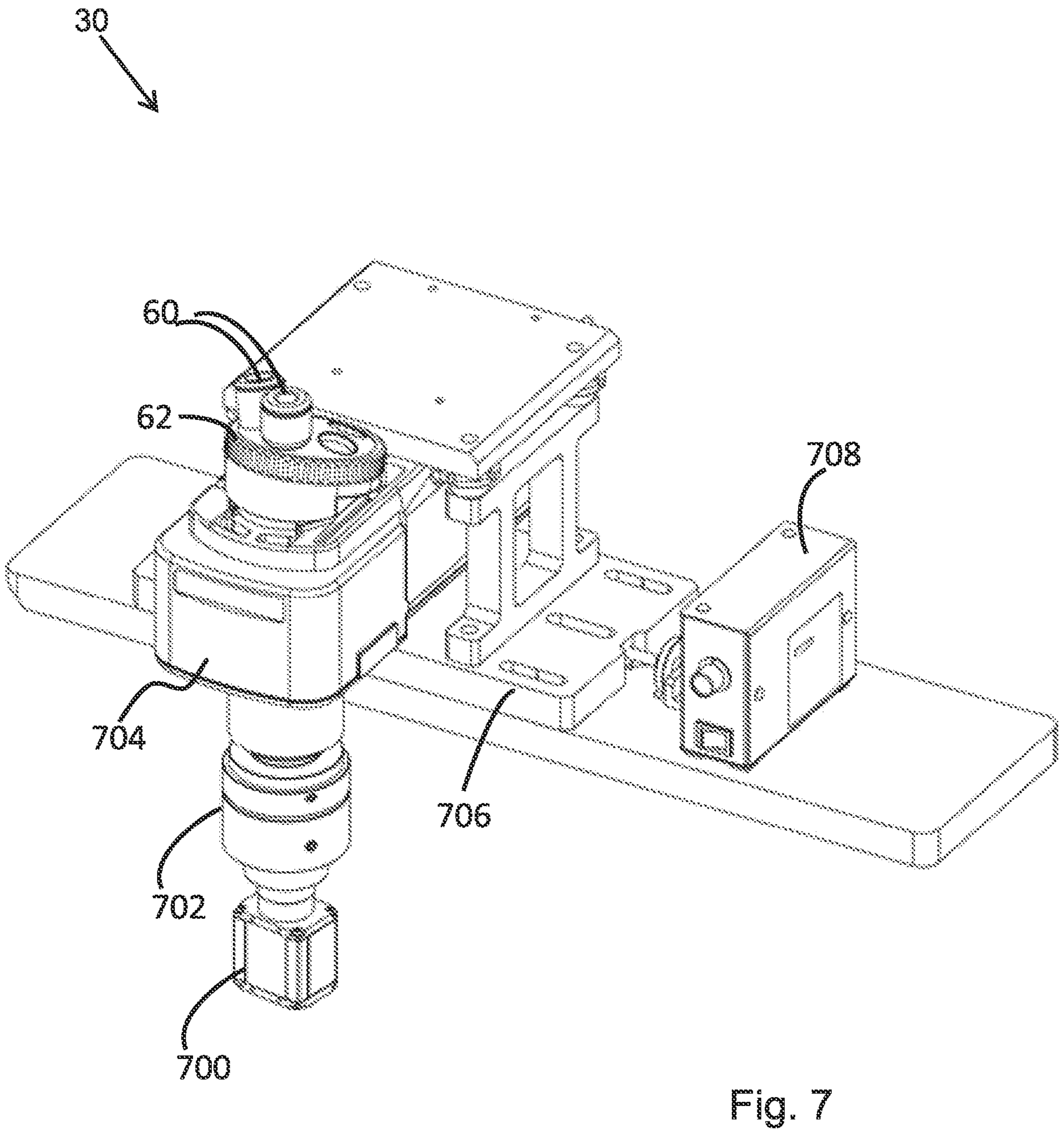

FIG. 7 is a schematic illustration of the imaging module 30, according to some embodiments of the present invention. Shown in the figure are the lenses 60, and the lens selector 62, described above with respect to FIG. 2. The imaging module 30 includes a camera 700, connected to the imaging module by an adapter 702. A light source 704 provides a light for viewing an object in the field of view (FOV) of the camera. The light source may be provide a coherent laser beam for focusing a gem facet in the FOV, as described further hereinbelow.

Figure 8:
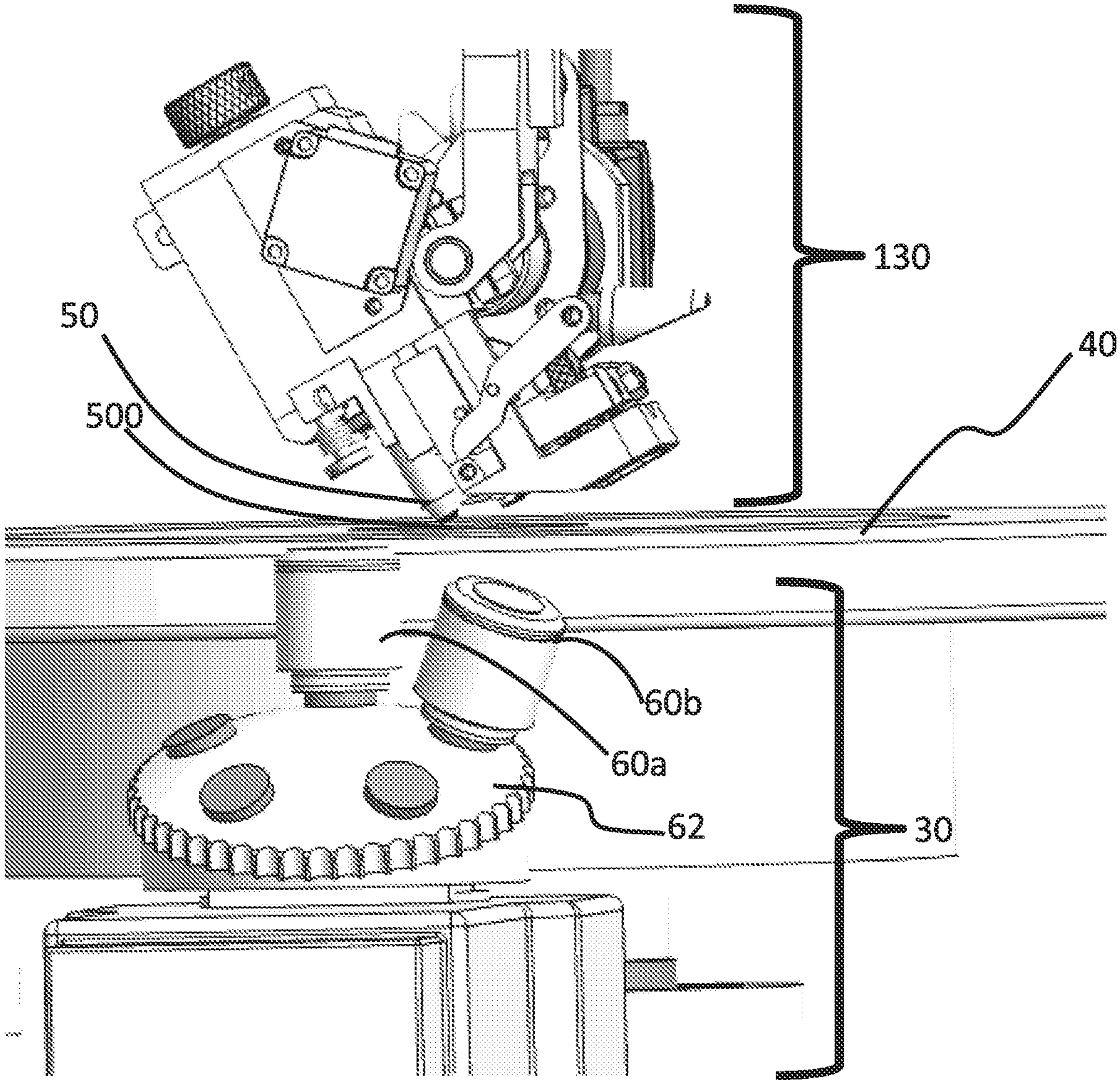

The imaging module 30 also typically includes a calibration plate 706 for fine tuning the position of the lenses with respect to the robotic apparatus. A power supply 708 may provide power for the camera, lens selector, calibration plate, and/or lenses FIG. 8 is a schematic illustration of a further close-up of rotary holder mechanism 130 and the imaging module 30, according to some embodiments of the present invention. The rotary holder mechanism includes the gem holder 50, which keeps the gem 500 in place against the polishing wheel 40 during polishing. After an interval of polishing, the rotary holder mechanism is moved by the horizontal and vertical controllers so that the gem is then positioned above lens 60*a*, which is shown as the lens currently selected for viewing by the lens selector 62. Lens 60*b* is shown as an alternative lens; the lens selector may include multiple lenses as required in order to provide multiple magnification options.

Figure 9A:
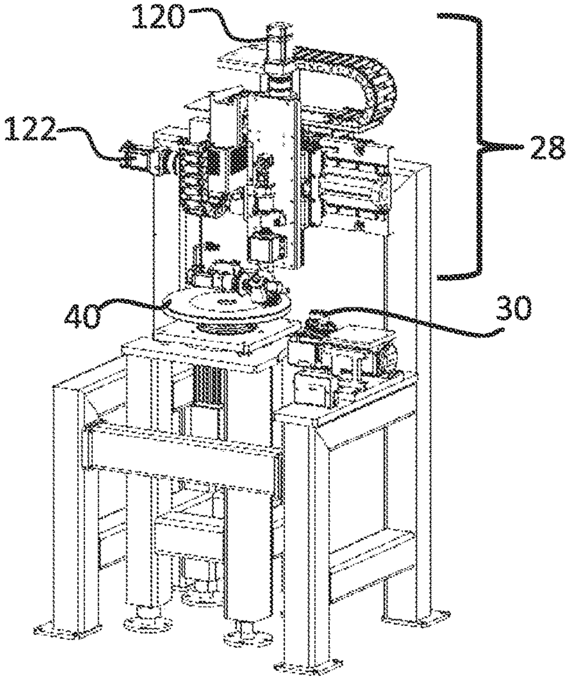
Figure 9B:
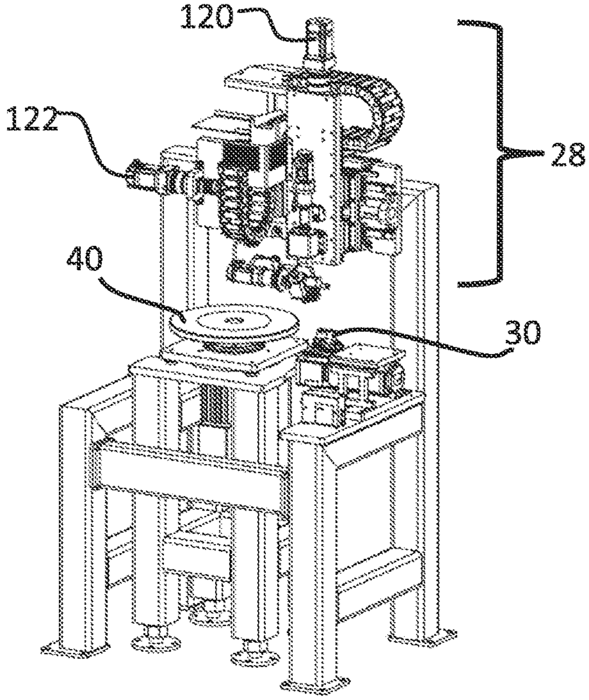
Figure 9C:
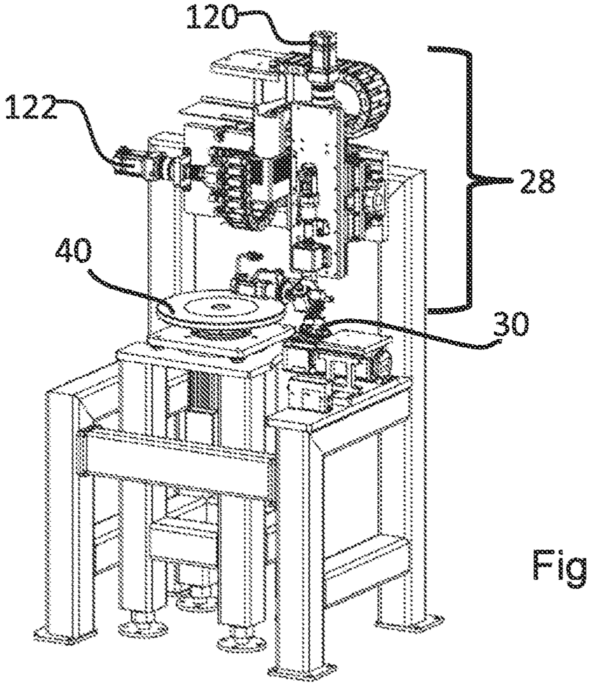

FIGS. 9*a*-9*c* are schematic illustrations of the polishing apparatus 22, showing the apparatus when the robotic apparatus 28 is in various positions, according to some embodiments of the present invention. The figures show the movement of the vertical axis controller 120 and of the horizontal axis controller 122 as the robotic apparatus 28 moves a gem from the polishing wheel 40 to the imaging module 30.

In FIG. 9*a*, the robotic apparatus 28 is shown positioning the gem on the polishing wheel 40.

In FIG. 9*b*, the vertical axis controller 120 has lifted the gem above the polishing wheel 40 and the horizontal axis controller 122 has moved the gem horizontally towards the imaging module 30.

In FIG. 9*c*, the horizontal axis controller 122 has moved the gem to a position above the lens 60*a*, and the vertical axis controller 120 has moved the gem downwards, into the field of view (FOV) of the lens.

Figure 10A:
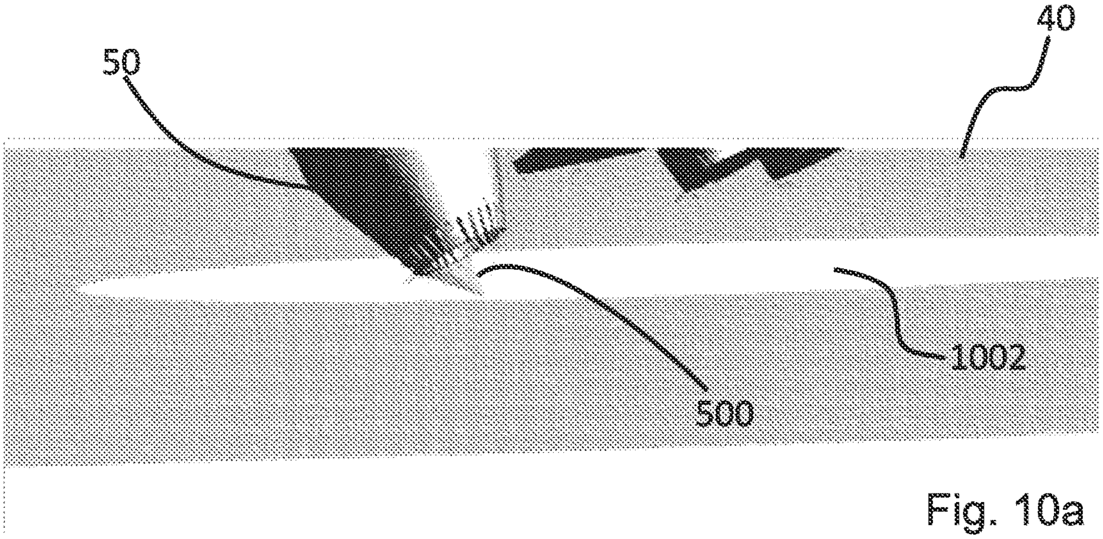
Figure 10B:
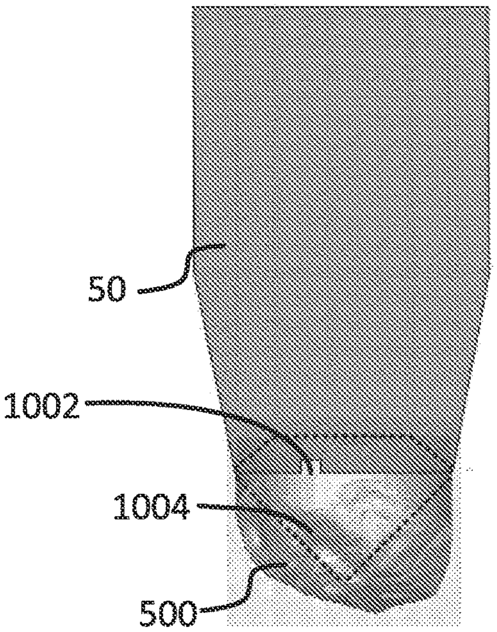

FIGS. 10*a* and 10*b* are schematic illustrations of further close-ups of the gem holder 50, according to some embodiments of the present invention. The gem 500 is shown in FIG. 10*a* in contact with a track 1002 of the polishing wheel 40. The polishing wheel typically has multiple tracks of varying levels of coarseness and wear. The horizontal axis controller may move the gem closer or farther from the edge of the wheel to select different tracks. FIG. 10*b* shows a holder mark 1002 on the holder 50. The holder may have multiple marks, such as small grooves etched in the edge of the holder to facilitate registering the gem with known 3D coordinates with respect to the holder. The coordinates may then be registered with respect to a "virtual" 3D target model 1004 of the finished, target gem, so that the target model (which is stored previously in the memory of the computer) is effectively registered with respect to the holder. Hereinbelow, the term "virtual target model" refers to the planned, 3D dimensions of the finished gem, these dimensions being previously stored in the memory of the computer. The target model, which is designed in advance, indicates the dimensions of a gem that is the goal of the polishing process.

Figure 10C:
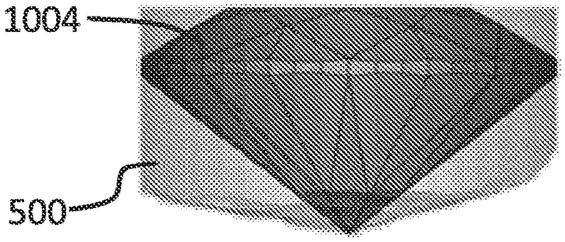

In embodiments of the present invention, coordinates of the current gem in the holder (also referred to hereinbelow as the "current gem") are registered with coordinates of the virtual 3D model of the rough gem (the "input" model) and of the target model, as described further hereinbelow with respect to the flow chart of FIG. 11. Shown in FIG. 10*c* are the input ("rough") gem model 500 and the input target gem model 1004.

Overall Polishing and Grading Process

Figure 11:
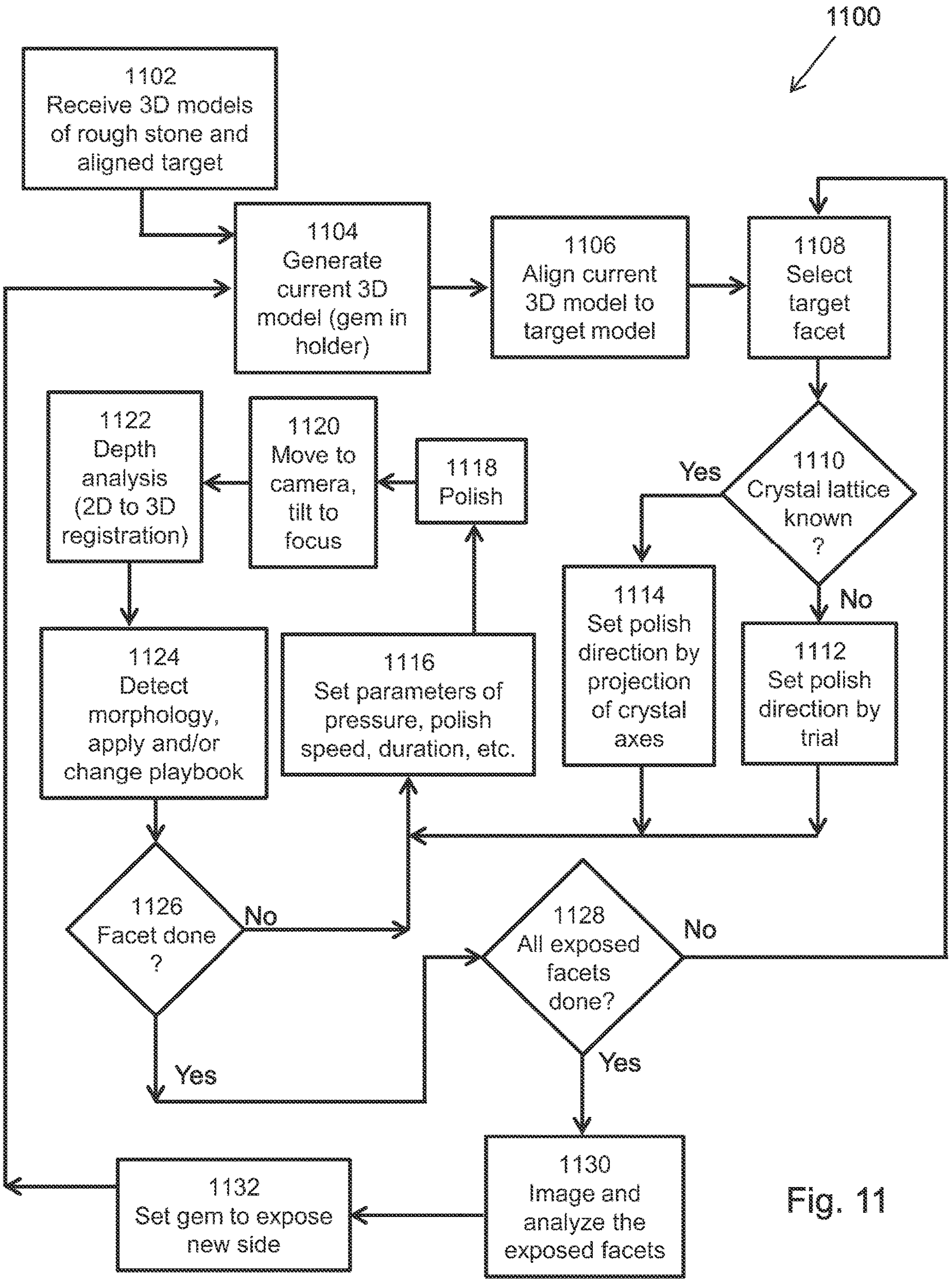
FIG. 11 is a flow diagram of a process for automated polishing and grading of gems, according to some embodiments of the present invention.

FIG. 11 is a flow diagram of a process 1100 for automated polishing and grading of gems, according to some embodiments of the present invention. Initially, the computer 22 receives, as input from an external source, a 3D model of the rough gem (the gem before polishing), as well as the target 3D model 1004 (step 1102). These 3D models are also referred to herein as "virtual models," to differentiate them from the current 3D model generated from a gem in the holder 50 (the "current model"). Alternatively, the system can work without external input, instead generating a virtual target model based on the measured, current 3D model. That is, the system can be configured to measure the current 3D model of the rough stone and to allocate a target model within the current 3D model, in which case there is no need for a registration step described below.

A current 3D model is generated at a step 1104, after the gem is positioned and set in the holder 50, and the holder is mounted into its position in the apparatus, as described above. It is understood that the gem is typically repositioned in the holder several times during the polishing process before a finished gem is produced, as only part of the gem is exposed and can be polished at any one time. One placement orientation exposes the top or "crown" of the gem, and a second placement orientation exposes the bottom or "table" of the gem. Additional placements may be required to fully expose the sides, or "girdle," of the gem.

After the gem is in the holder, step 1104 proceeds with the computer 22 directing the robotic apparatus 28 to move the gem to the FOV of the camera. The computer 22 then controls the robotic apparatus 28 to turn the rough gem, presenting to the camera multiple views that are then used to generate the current gem 3D model. Coordinates of this 3D model are aligned with a known position of the holder that is also viewed in the images; for example, the known position may be determined by one or more holder marks, as described above. The modelling process is described in more detail hereinbelow with respect to FIG. 12. The modelling process assumes that the dimensions of images acquired by the imaging module are calibrated in advance, that is, the pixel distances are known in metrics such as micrometers.

At a step 1106, the coordinates of the current 3D model (more precisely, the coordinates of the exposed surfaces of the current gem) are registered to coordinates of the 3D model of the target gem. As indicated in the figure, the steps may be iterative, that is, the registration process may be performed more than once, each time increasing the accuracy of the registration. Details of generating the 3D model of the gem in the holder and alignment to the virtual finished gem are described in more detail below with respect to FIGS. 9-11.

After the gem in the holder is registered to the target 3D model, a facet of the target 3D model is selected as a polishing target (Step 1108). The selection may be performed automatically by a rules engine, which is also referred to herein as a "playbook" function of the computer, as described further hereinbelow. Based on the facet selected, the computer determines how the robotic apparatus is to orient the gem in order to place the proper facet of the gem in contact with the polishing wheel.

After the proper facet is selected (designated the "current" facet), the polishing direction must be set. The rate of polishing a diamond facet is anisotropic, that is, the rate is dependent on the direction that the facet is oriented with respect to the motion of the polishing wheel. The polishing direction is a function of the diamond crystal structure; therefore the method of determining the direction depends on whether or not an orientation of the gem's crystal structure ("lattice structure") is known (decision step 1110). (For further reference, see L. Pastewkal. et al., "Anisotropic mechanical amorphization drives wear in diamond," *Natural Materials,* 10 (2011), pp. 34-38, the disclosures of which are incorporated herein by reference.)

If the crystal structure is not known, the polishing direction may be determined by trial and error, that is, by rotating the facet in various directions on the polishing wheel and measuring the polishing success after each trial (step 1112). After the polishing directions of several facets have been determined by trial and error, general parameters of the crystal structure with respect to polishing direction can be determined (e.g., orthogonal vectors of the crystal lattice). Once these parameters of crystal structure have been determined, the crystal structure can be used to estimate optimal polishing directions for new facets (step 1114), thereby circumventing the process of trial and error, as described further hereinbelow with respect to FIGS. 16-18.

After setting the polishing direction by the methods described above, additional parameters of polishing are set at a step 1116, including the polish speed, pressure, and track (e.g., coarse or fine polishing wheel track). These factors are determined by a "playbook" function of the computer, as described above, which sets the polishing parameters according to several factors, such as the depth of polishing required to reach the target facet and the types of artifacts appearing on the current facet, as described further hereinbelow.

After all the polishing parameters are set, the controller moves the axis controllers (i.e., motors) of the robotic arm according to the polishing parameters, rotating and tilting the gem to put the correct side in contact with the polishing wheel 40, such that polishing is performed with the selected polishing direction applied. The gem is also positioned on the correct track with respect to the abrasive grade. The selected pressure is also applied (by the vertical axis controller). The rotating speed of the disk speed is also set, with consideration of the length of the disk circumference at the selected track position. A time duration of the polishing task is also set, and the polishing then proceeds (step 1118), generally until the end of the selected time duration. The duration may also be shortened if the temperatures of the gem and of the gem holder do not stay within an expected range.

When the selected time duration of polishing is completed, the computer moves the gem to the FOV of the camera in order to acquire one or more images the current facet (step 1120). Imaging may include a process of tilting the gem holder 50 in order to ensure that the current facet is perpendicular to the central axis of the lens 60*a*, as described further hereinbelow. A determination is then made of how much of the diamond was removed by polishing during the last polishing interval and how much more polishing is still needed to reach the target facet (step 1122).

At a step 1124, image analysis is performed with respect to the morphology of the current facet, that is, various artifacts in the facet surface are identified. These artifacts may include features such as scratches, pits, "lizard" bumps, burn marks, edge abrasion, polishing lines and cracks. As described further herein, the types of identified artifacts determine a "playbook plan" for continued polishing of the facet. The playbook may also indicate artifact thresholds, that is, artifact parameters that indicate a need to stop the automated polishing process and notify a human operator. The playbook plan determines parameters of polishing, including the polish speed, pressure, and track (e.g., coarse or fine polishing wheel track). The playbook plan may also determine that automatic polishing cannot correct a fault, or is not configured to correct the fault, in which case a human operator is alerted. In addition to determining a playbook plan for subsequent polishing, the artifacts that appear on the current facet also indicate whether the previous playbook plan was successful. That is, the previous plan can be "graded." If the previous plan was not successful, the playbook can be modified accordingly for future reference.

The playbook plan can also be influenced by additional parameters measured during and after polishing, such as the temperature of the gem, as measured by the heat sensors described above.

The depth analysis determines if the target facet has been reached. At a decision step 1126, if the target facet has not been reached, then polishing of the facet continues at the step 1116. As indicated in the figure, steps 1116 through 1126 are iterative steps, which continue until the current facet has been polished to the level of the target facet.

When the current facet is done, then a determination is made at a step 1128 as to whether all exposed facets are done. If not, a new facet is selected at the step 1108, and the polishing process continues automatically, without changing the position of the gem in the holder. If the polishing of all exposed facets is done, then, at a step 1130, the robotic apparatus 28 rotates the gem above the camera to allow each facet of the exposed gem to be imaged and analyzed. The analysis at step 1130 records faults and dimensions of each exposed facet, such that a polish, cut, and symmetry grades of the gem can be determined when the polishing of all facets is complete.

At a step 1132, the gem is repositioned in the holder to expose a new side, which is then polished according to the steps of process 1100, starting again at the registration steps 1104 and 1106. Repositioning may be done manually. When all sides (pavilion, crown, table, and girdle) have been polished, the faults and dimensions determined for all exposed sides independently at the step 1130 can be merged to provide overall polish, cut and symmetry grades of the gem.

FIGS. 10-21 are schematic illustrations of details of process 1100, according to some embodiments of the present invention.

Input Gem Registration

Figure 12:
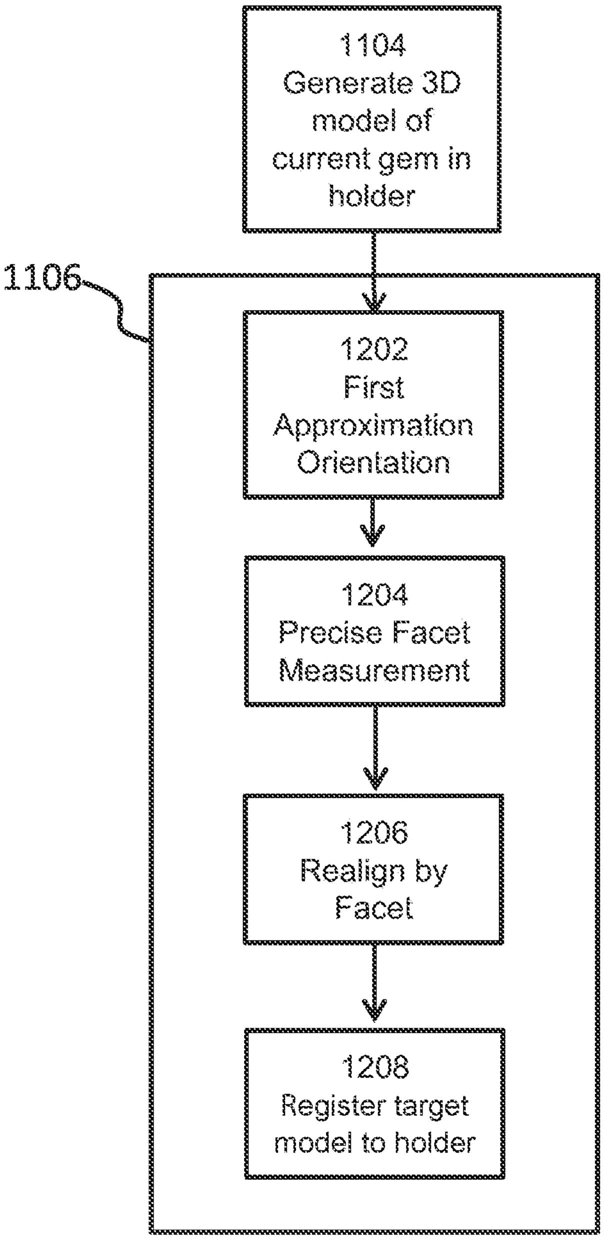
FIGS. 12, 13*a-e*, 14, 15, 16*a-b*, 17*a-b*, 18, 19, 20 and 21 indicate aspects of the process for automated polishing and grading of gems, according to some embodiments of the present invention.
Figure 13A:
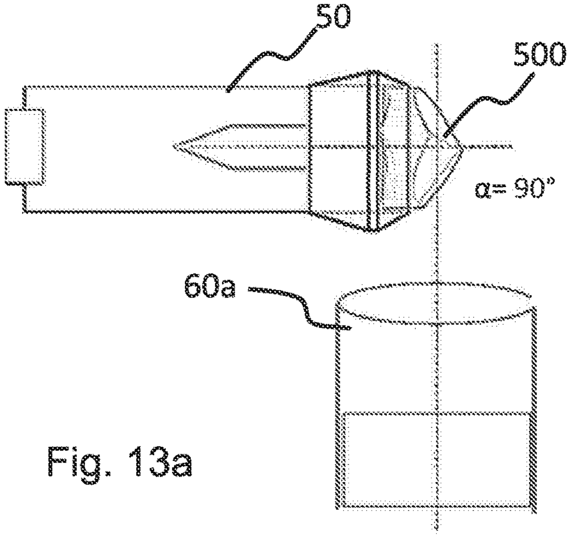
Figure 13B:
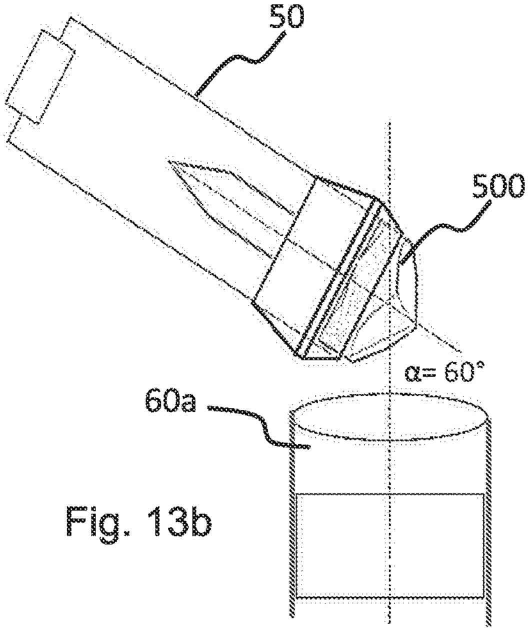
Figure 13C:
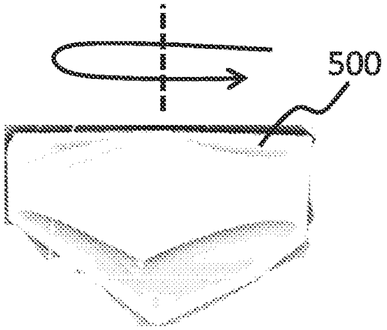
Figure 13D:
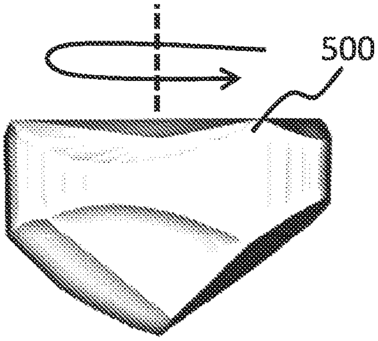
Figure 13E:
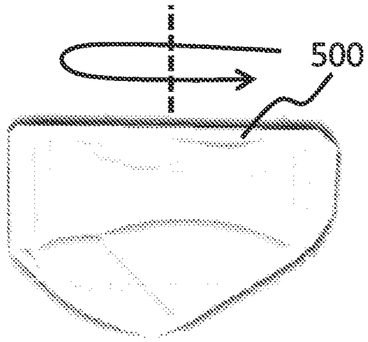

FIG. 12 is a flow diagram of steps of processes 1104 and 1106 for registration of a gem in the holder, according to some embodiments of the present invention. Registration is performed by processing images of the gem acquired by the imaging module, and then comparing the resulting current 3D model with the input 3D model, as described above with respect to FIG. 11. Step 1104 includes the following steps to generate a 3D current model, which, as described below, is an "average 3D" current model:

1. Setup—The gem is set inside the holder so that the crown is inside the holder and the pavilion is outside, or vice versa. The holder is mounted on the robotic arm.
2. Holder registration—Based on images including the holder markings, coordinates of the holder are determined.
3. Positioning—The holder 50 is oriented with the holder center axis aligned perpendicular to the center axis of the camera lens (i.e., at an angle $\alpha=90°$) and the exposed portion of the gem 500 in the center of the FOV of the lens 60*a* (as indicated in FIGS. 13*a* and 13*b*).
4. Lens selection—The system may change the lens to the 3D modeling lens.
5. Silhouette imaging—The camera captures a silhouette of the gem, indicated as silhouette 1402 with respect to FIG. 14 and then rotates the gem around the holder center axis by X degrees. The process continues (rotate gem, capture image) until the rotation completes 180 degrees (as indicated in FIGS. 13*c*-13*e*).

Figure 14:
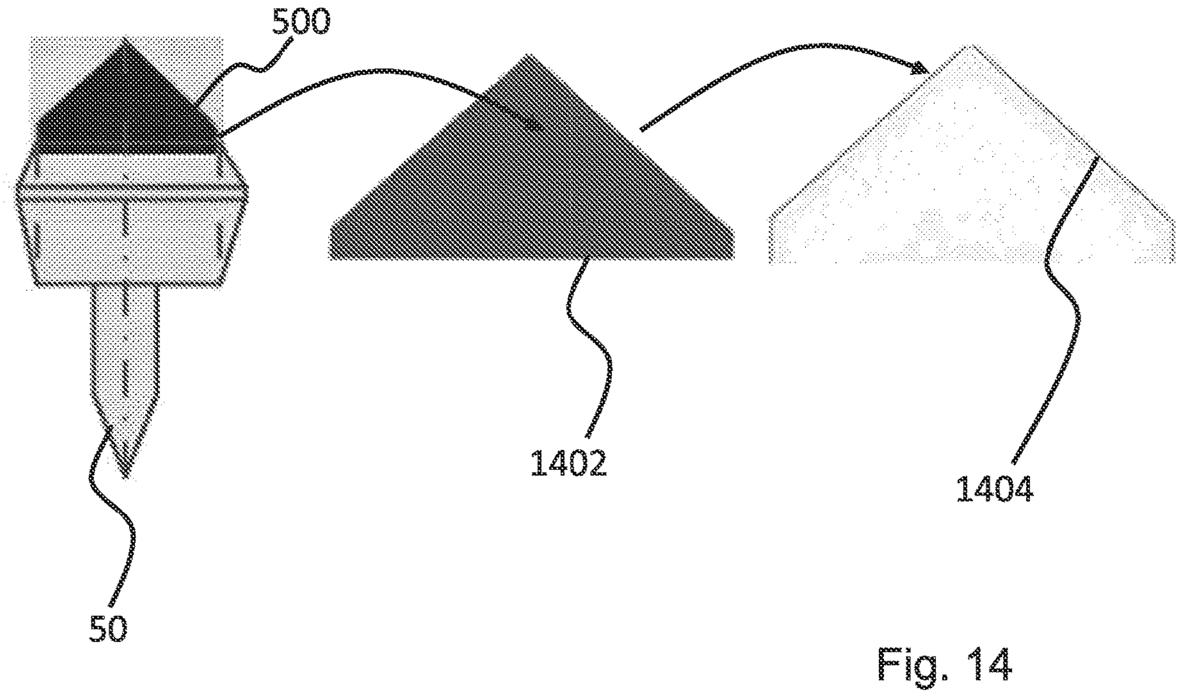

6. Edge-detection—A process of sub-pixel edge-detection is performed for each silhouette, as indicated in FIG. 14, whereby the silhouette 1402 is used to generate an edge function 1404, based on an edge-detection process.
7. 3D model sculpting—each edge is used to sculpt the 3D model by "carving" the 3D model based on the images taken from the multiple angles. In one embodiment, a rough cube that is larger than the 3D model is iteratively "carved out," based on the dimensions of the silhouette images, given the known angles at which the silhouette images were acquired.
8. Tilt—The robotic arm tilts the gem in the camera FOV and repeats the processes of silhouette imaging, edge detection, and 3D model sculpting (FIG. 13*b*). Each additional tilt and silhouette capture increases the accuracy of the 3D model.
9. Averaging—Averaging of the 3D models of each tilt gives a more accurate average model. Two or more averaged 3D models are aligned to the same orientation. The average is done for every two points that are on the surface of the two 3D models and are on the same normal. The result is a current 3D model based on all averaged 3D points.

After the current 3D model is generated, it is registered with the input 3D model at the step 1106, which includes the following sub-steps. At a sub-step 1202, the current model is "roughly" aligned to the input model. The rough alignment may be determined by a "volume allocation" procedure. This procedure begins by uniformly "shrinking" one of the 3D models such that no point on the smaller 3D model extends beyond the geometric boundary of the other 3D model. Next, the shrunken model is "inflated" by a uniform increment, such that in an initial orientation a portion of the inflated model extends beyond the geometric boundary of the other 3D model. The inflated model is then rotated until no point on the inflated 3D model extends beyond the geometric boundary of the other 3D model.

Ideally, given the current 3D model and the input 3D model should be identical, the incremental inflation and rotation process should end when the two models are precisely superimposed. In practice, the current and ideal 3D models differ slightly and the process ends when?

Figure 15:
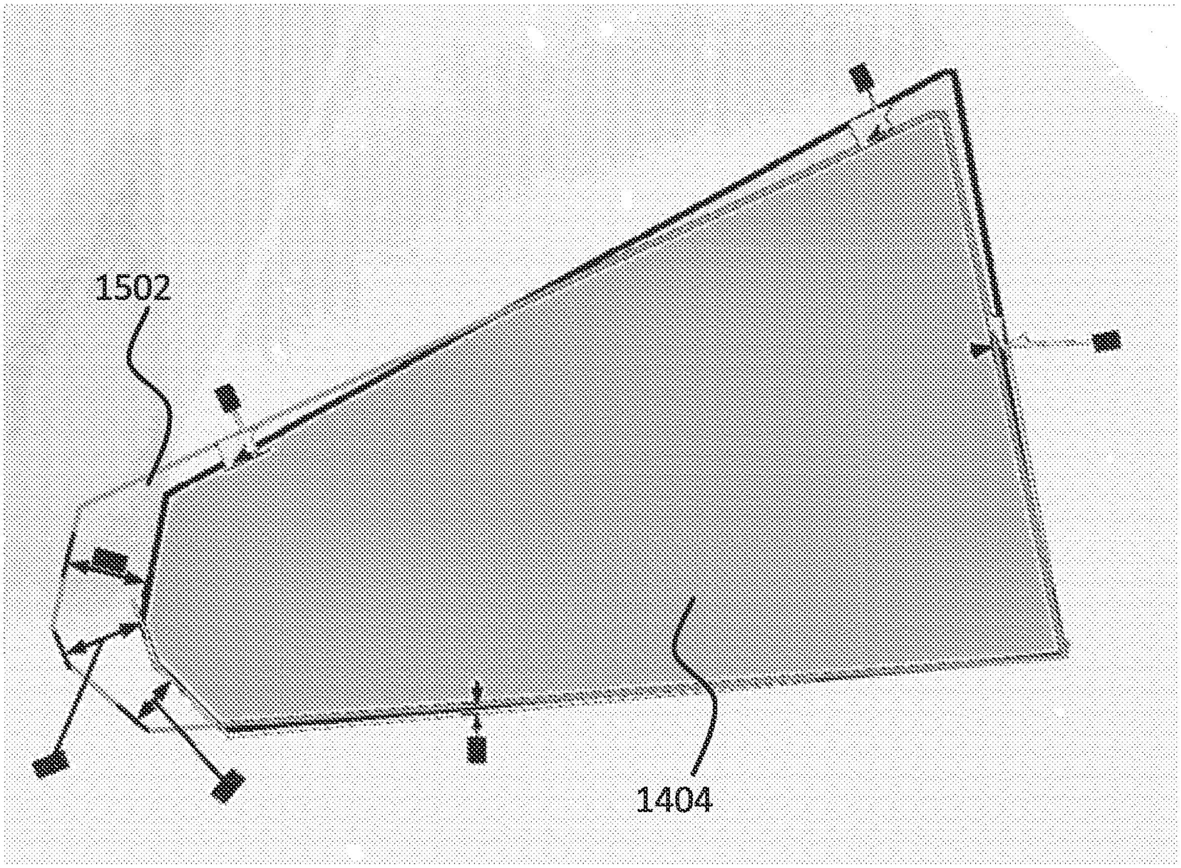

At a sub-step 1204, after the two 3D models are roughly aligned, candidate facets of the current gem are selected for fine tuning of the alignment, based on 2D edges. Any edged facet may be selected. The process is typically successful with one candidate facet, but more facets increase the accuracy. At a step 1204, a candidate facet is imaged as facet edge 1404, as indicated in FIG. 14. At a step 1206, the dimensions of the facet edges are then measured, and matched to the corresponding (i.e., registered) facet 1502 of the input 3D model, as indicated in FIG. 15. Differences between the dimensions of the two corresponding facets indicate that the two models must be tilted and rotated relative to each other until the two facets align of the rough orientation of the input model. We can repeat this process with additional candidate facets and thus increase the accuracy of the alignment of the input model to the current model.

Finally, at a step 1208, based on the alignment of the input model to the current model, the target model (pre-aligned to the input model) may be registered "within" the current model. Subsequently, the registration of the target and current models allows a facet of the current model to be accurately selected for polishing, according to a selected facet goal of the target model.

Polishing Direction

Figure 16A:
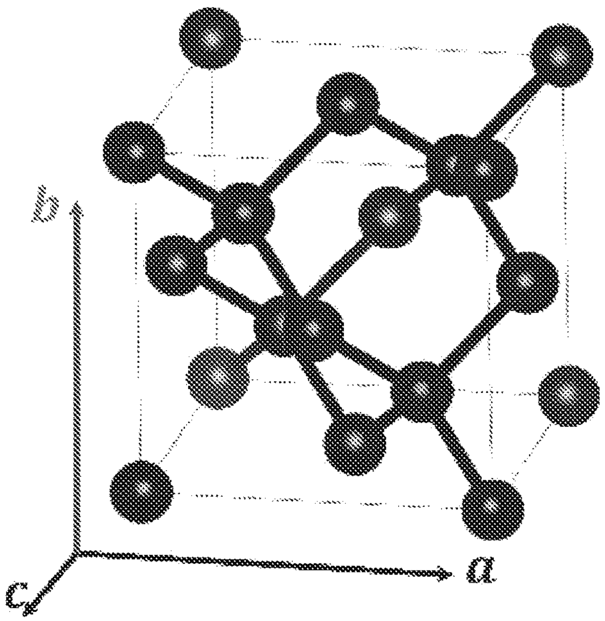
Figure 16B:
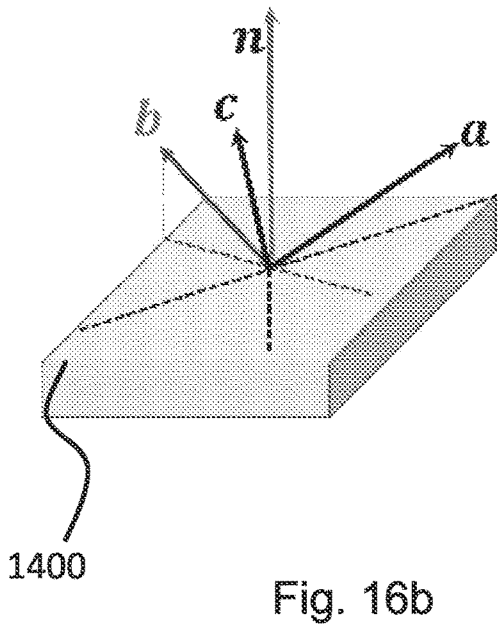

We also assume that the diamonds are available in the form of single crystals (FIG. 16*a*). The "easy" or "effective" polishing directions are the orthogonal projections of the a, b or c crystallographic axes to the facets of the crystal (indicated in FIG. 16*b*). The directions of easy polishing are indicated in FIG. 16*b* by the vectors, and c as those are seen from the top of the face. The corresponding three easy polishing directions are indicated by the dashed lines. The initial easy polishing directions may be determined by trial-and-error, whereby multiple directions on a facet are polished, and the easy direction is determined as the direction that is polished at the greatest removal rate during a given interval of time. In some embodiments, the removal rate is measured as the volume of polishing (for example in units of $um^3/h$ or mg/h). The volume removed may be determined by a 2D to 3D match, or registration, between an image of the current facet and the previously determined 3D model, as described above.

Figure 17A:
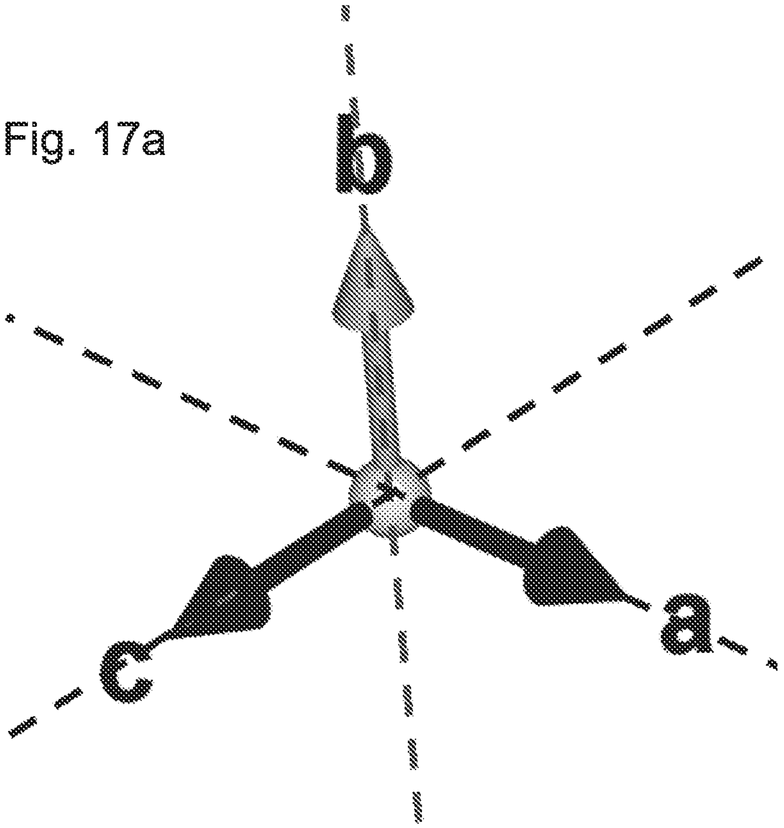
Figure 17B:
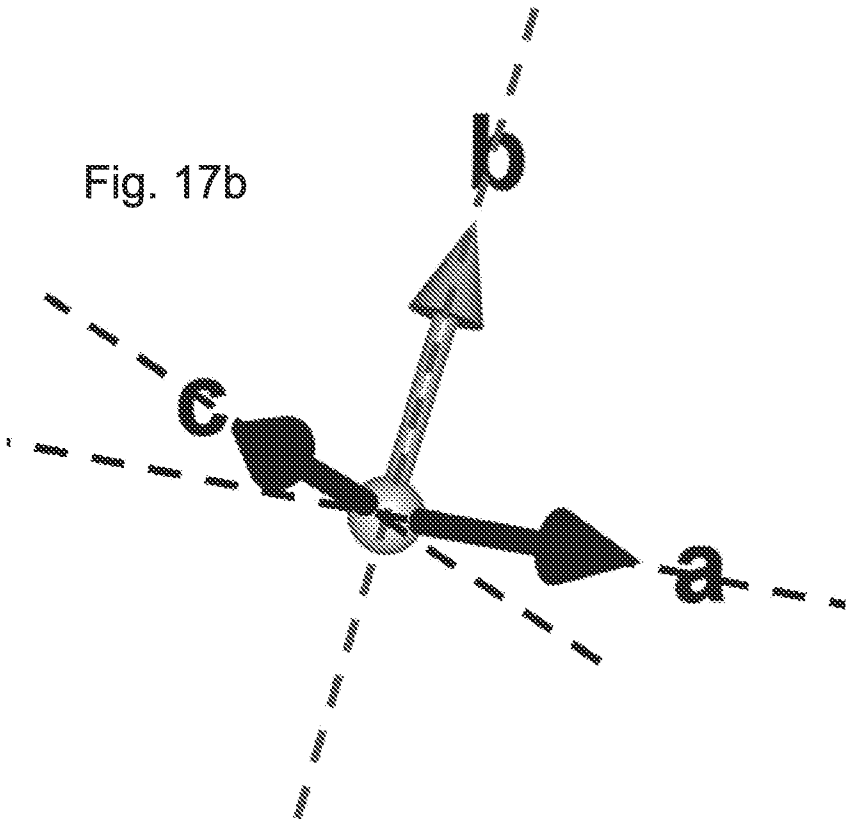

Two additional examples, in FIGS. 17*a* and 17*b* demonstrate views of the basis vectors of the crystal lattice, the corresponding three easy polishing directions are indicated by the dashed lines.

The orientation of the vectors a, b or c, which provide the best match between the observed and predicted directions of easy polishing of each facet, can be determined from the following process, which may be programmed as, for example, in C++ or a MATLAB script.

Figure 18:
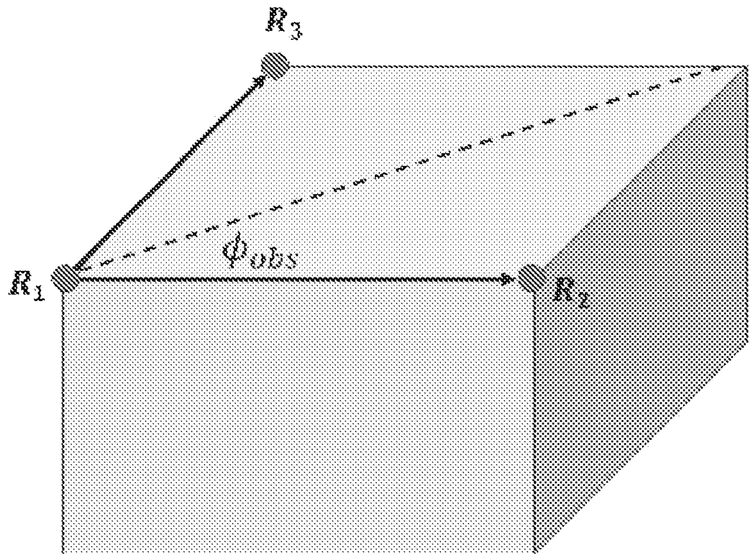

1. Generate a large set of probed crystal orientations. Each orientation is defined by three orthogonal vectors a, b and c.
2. Calculate the easy polishing directions for each of orientation. For example, the easy polishing direction, corresponding to a is [n×[n×a]]. Here n is the normal to a facet, which is calculated from the input data.
3. Calculate an error sum $S=\Sigma_{2N,i=1}([\phi_{obs,i}-\phi_{calc,i})]$, where N is the total number of easy polishing directions, $\phi_{obs,i}$ and $\phi_{calc,i}$ are observed and calculated angles between these directions and the plane of the facet (see FIG. 18).
4. Choose an orientation giving the least error sum S. Input parameters may include 10 numbers for each face. These may be Cartesian coordinates of three arbitrary points (e.g. the coordinates of three vertices, R1={X11,X12,X13}, R2={X21,X22,X23}, R3={X31, X32,X33}) and of the direction of easy polishing (the angle between the easy polishing direction and R2–R1 direction). The input parameters are indicated in FIG. 18. Any other format of the input data can be used if necessary.
5. Output parameters: orientation of the vectors, a, b and c (in the same Cartesian coordinate system), corresponding to the best match between the observed and calculated easy polishing directions. A table of all the calculated angles versus the observed angles can also be generated.

Facet Focus Adjustment

After polishing, the robotic apparatus moves the gem to the imaging module at the step 1120, described above with respect to the flow chart of FIG. 11. To improve the accuracy of subsequent steps of image analysis, the dimensions of the facet are determined accurately by ensuring that the current facet is not tilted with respect to the central axis of the lens 60*a*. The orientation of the gem holder 50 is tilted until a reference light beam is in focus.

Figure 19:
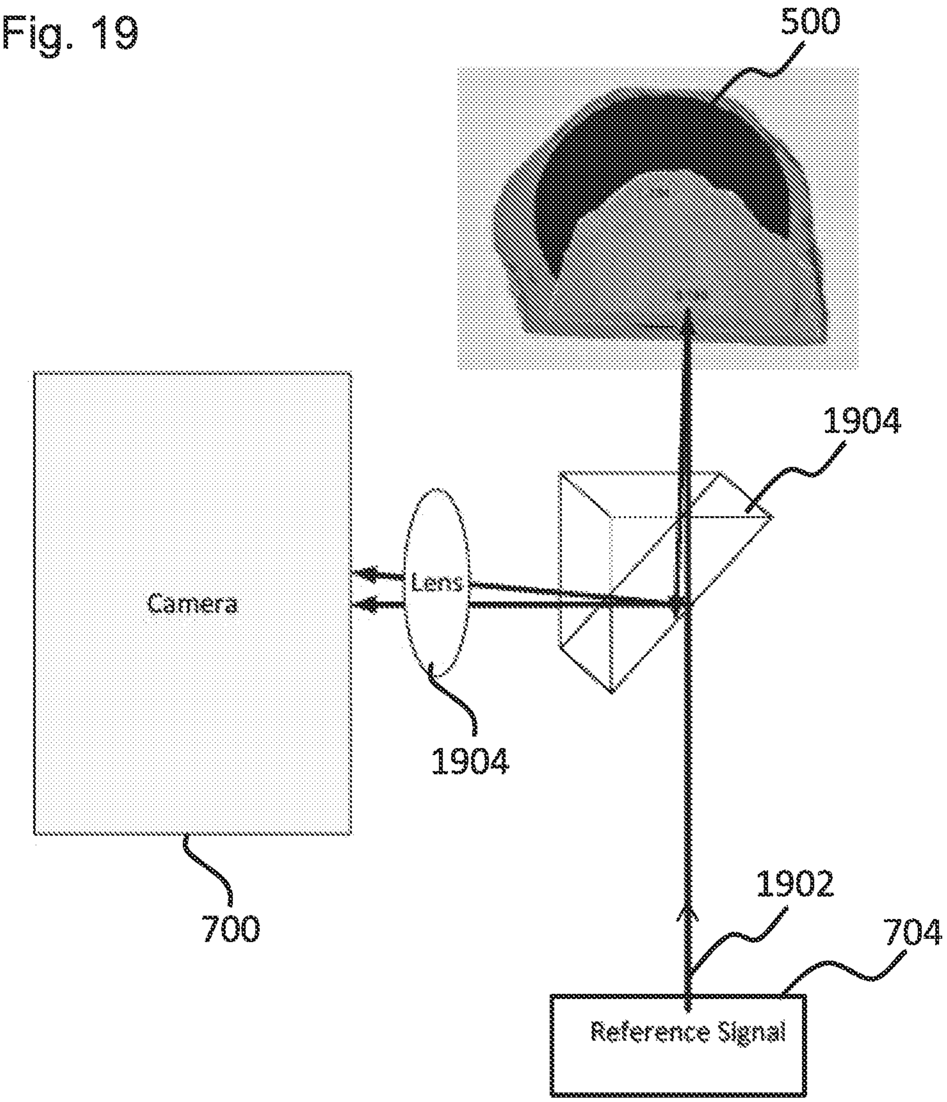
Figure 20:
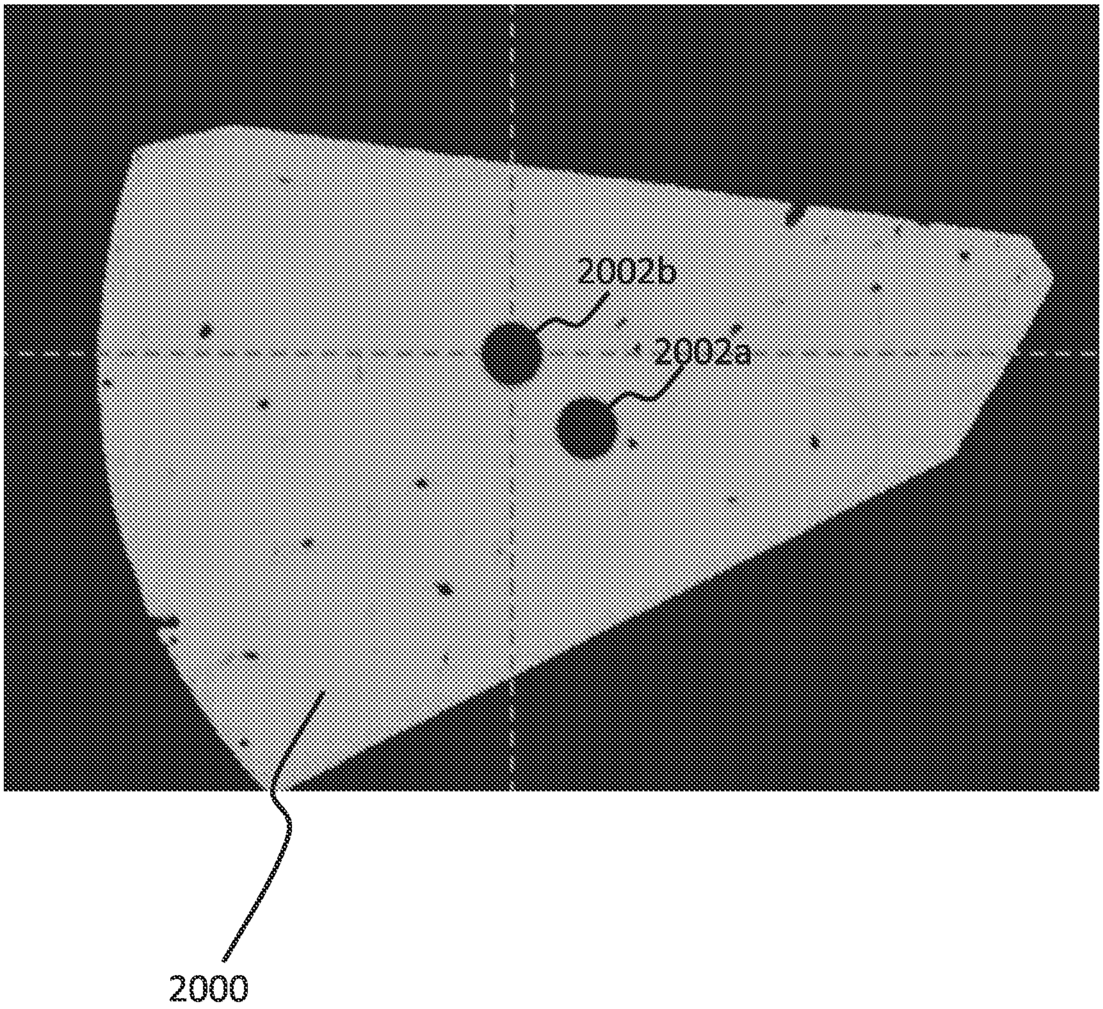

As indicated in FIG. 19, the light source 704, described above with respect to FIG. 7, provides a reference light beam 1902 that is a referenced for correcting tilt of the current facet of the gem 500. The reference light beam may be a coherent laser beam. The light source may also include a beam splitter 1904 and a lens system 1906, such that the reference beam is split, part of the beam being reflected towards the camera 700 and part being directed towards the current facet of the gem, before being reflected back to the camera. If the gem facet is oriented perpendicular to the reference beam (which may be emitted perpendicularly to the central axis of the camera lens, or parallel, in alternative embodiments), then only a single spot of the reference beam appears in an image of the facet acquired by the camera. If the facet is tilted, then two beam spots appear in the image. These spots are indicated in FIG. 20, on facet image 2000, as respective spots 2002*a* and 2002*b*.

When the spot of the reference light beam is double, the computer instructs the robotic apparatus to incrementally tilt the holder until the two spots merge. In an alternative embodiment, an edge focus procedure is performed to correct for facet tilt. The following edge focus procedure may also be performed to ensure that the facet positioned at the optimal depth of focus. Steps of the edge focus procedure include:

1. Perform Canny edge detection, to represent the contour of the facet edge.
2. For each pixel on the edge contour, check the surrounding pixels.
3. Divide the facet image into 4 quarters (The center is the center of rotation, not necessarily the center of the image)
4. Rate each pixel of the contour by the sharpness of its surrounding pixels.
5. Sum the ratings of all pixels in each quarter and divide by the number of pixels (giving 0 as a sum for Blurry, 1 for the sum for Sharp) to generate an "in-focus" score for each quarter.
6. Physically tilt holder horizontally and vertically by incremental steps (by robotic arm tilt and rotary controllers), and in and out move the gem holder closer and farther from the lens, also by incremental steps, until the edge ratings give the maximum "in-focus" scores for all four quarters.

Once the entire facet is in optimal focus, a facet image is acquired for use in the subsequent steps of 2D-to-3D alignment and morphology analysis.

Depth Analysis (2D-to-3D Alignment)

To determine the depth (i.e., removal rate) and angular position of polishing during a polishing interval, the computer first aligns the 2D image acquired by the process described above with the previously generated, "current" 3D model, that is, the model calculated by the prior modelling analysis before the polishing was performed (which is typically in a mesh format). The cut angle, i.e., the angle at which the polishing was supposed to be performed, as well as the intended polishing depth, are set before the polishing is performed and may be estimated from the robotic apparatus encoders. However, the encoder measurements include errors due to the pressures and the heat generated by the polishing process. Consequently, the 2D image is aligned by image processing to the previous 3D model, and based on the alignment the previous 3D model is "sliced" to generate an accurate, new, "current" 3D model.

Figure 21:
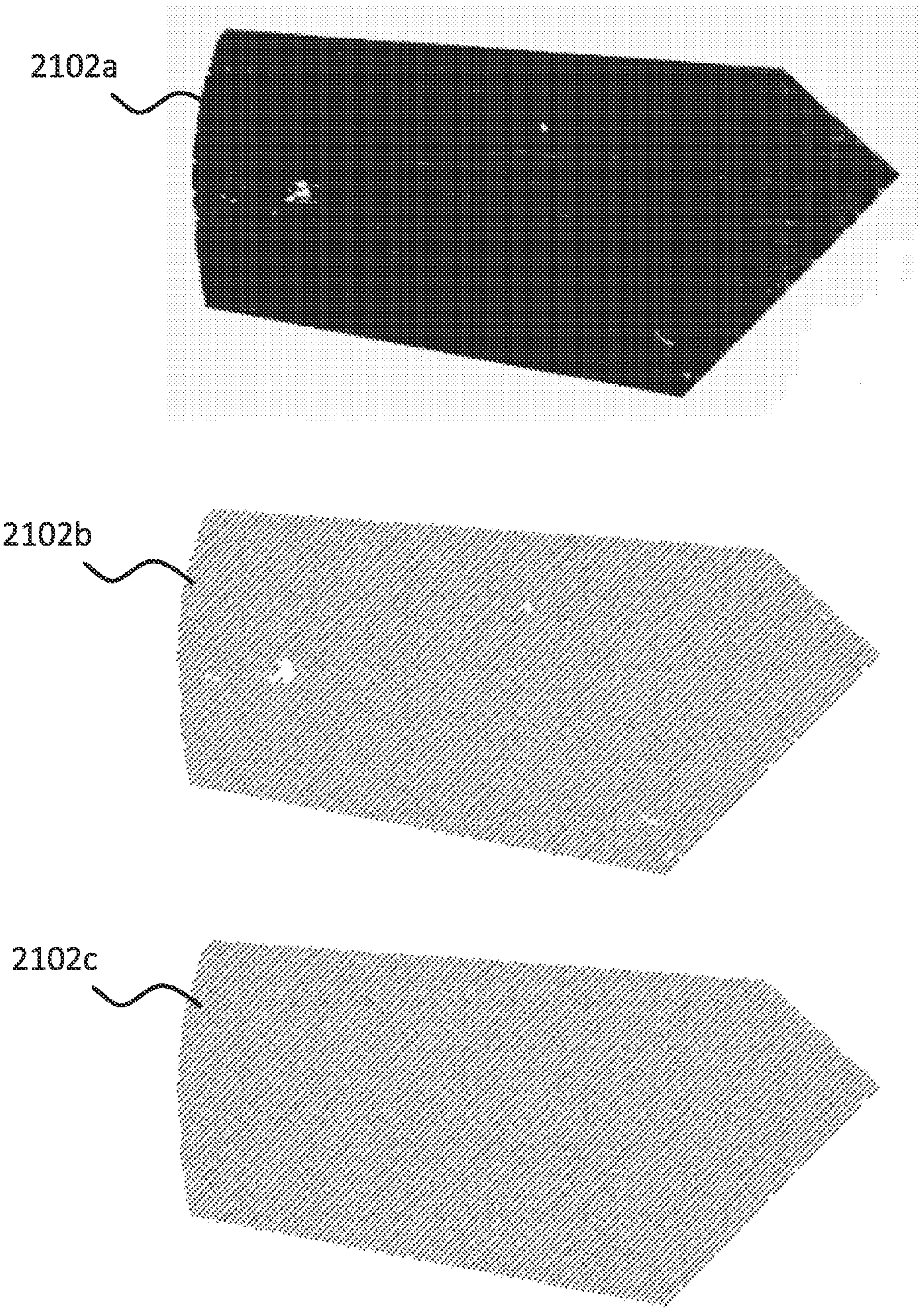

Before performing the alignment, the following steps are typically performed first to "clean" the facet image (steps are also indicated in FIG. 21 as facet images 2102*a*, 2102*b*, and 2102*c*):

1. The gray level image of the facet is converted into a clean binary image, where each 'white' pixel indicates presence of a facet in the image.
2. The facet image is resized, for example to 15% of the original resolution to speed up calculations using well known image resizing procedure. Resizing may vary from 10% to 100%.
3. The facet image is processed to remove noise, by applying Gaussian smoothing filter, at a size of, for example, 5×5 pixels (or 4×4, or 3×3, etc.) and a standard deviation of 1 pixel.
4. A threshold (e.g., 170 gray levels) is applied to obtain a binary facet image.
5. Some morphological operations are applied to get a better binary image:
   a. Dilation (5×5 pixels)
   b. Erosion (5×5 pixels)
   c. Labeling (separating the binary image into connected components), for example by selecting the largest label (connected component) and removing other labels Holes in the selected label may be filled.

Given the facet image, the previous 3D model, and the estimated cut angle, the following steps may then be performed to estimate the "current facet" of the gem. First, the 3D model mesh is rotated to be aligned with the estimated cut angle. Then, a search is done to find the best estimate of "cut values", that is, the best estimate of the cut angle and the cut depth. Various values are tested, where each set of values gets a score, until the best score is found. For example, cut angles may be tested from −0.3 radians to +0.3 radians of the estimated cut, each increment being 0.05 radians. For each angle, cut depths from 1.5 mm to 2.5 mm may be examined, at increments of 0.05 mm (camera to facet depth is near 2 mm). The depth with the best score is then selected, and a new search is made again around the selected depth, at a smaller increment of change, for example where the angle steps halved, and the range being in a smaller interval, for example of only ±0.2 mm (e.g., from 1.8 mm to 2.2 mm if the best depth is 2 mm). These steps may be repeated in multiple iterations, where the increment is always halved between iterations. After finding the best depth for the given cut angle, a finer search is done for each angle, as well as for depth.

For each cut angle and depth, a score is calculated to determine how good the estimate is. The score range may be set from 0 to 1. Scoring may be performed by the following steps. A facet image is computed from the intersection between the rotated mesh and a plain at the cut values. The plain-mesh intersection is computed by intersecting each triangle in the mesh and the plain, while drawing the intersected lines, and then the resulted polygon is filled. The image matching first matches the angle (based on image moments) and then position (based on center of gravity). The matching counts the number of the non-matched pixels, related to the total number of 'white' pixels. Alternatively, the image borders, rather than the image area, may be matched. A function may then be defined as the distance between edges (e.g., mean of absolute difference, mean of squares, etc.).

After the best angle is found in the entire range, the step is halved, and the range is assigned as the best angle f one step. These steps are repeated in 5 iterations. At each iteration, the search for the most precise depth registration is performed. Finally, the same process is repeated for the second angle. At each iteration the entire search for the first angle is done. The result of the last iteration is the best modelled estimate of the current facet of the current gem, that is, the facet of the gem after cutting away the part that was polished. Faster searches may be achieved by examining a reduced number of cut values, or by using a simpler scoring method.

The target method could optimize different factors for matching the image with the sliced 3D, to reduce the amount of searching. The score may determine not only how successful the matching is, but which direction the next iteration goes, therefore limiting the search. Parameters that may be calculated include: area, perimeter, average edge distance, square sum of edge distance, and length of matching edges. The change of these parameters between iterations provides an indication of whether the score is improving or getting worse, which provides an indication of whether to continue searching in a given direction.

Morphology Analysis

Machine learning is used to achieve three main aspects of facet morphology analysis:

1. Detection & Classification System—A module for image processing of the current facet to detect and classify the types of artifacts on the surface.
2. Polishing Playbook—a "playbook" that provides rules for resolving different types of artifacts while "maximizing the safety" (i.e., minimizing the risk of damage) of the gem during continued polishing.
3. Polish grading system—determining a final polish grade of the entire gem.

The detection and classification module detects, classifies and segments each artifact on the surface of the facet. This is achieved by the following actions and subsystems:

1. Ground truth determination—creation of a database of all types of artifacts that the system is required to classify and segment. This database is created by taking images of facet on the system; manually classify the artifacts (using a software tool developed for this purpose) and manually segmenting each artifact (again with the same software tool) on each image according to a predefined color for each type of inclusion. Manual segmentation is done by an experienced trained gemologist.
2. Segmentation tool—A database of many examples (typically hundreds) for each type of artifact. The tool does segmentation semi-automatically. The tool is based on edge detection algorithms applied to the entire image or to regions of interest. The list of contours is tagged and the user can set the color of each contour detected, in order to tag large number of images manually.
3. Pre-Trained neural network—A neural network solves a similar or close problem of segmenting surface artifacts. Classifying and segmenting of artifacts relies on a CCD sensor.
4. Benchmarking—based on given labeled folder and ground truth.
5. Training stage—A training script runs neural network training on a GPU server to fine tune the network. The TensorFlow neural network package may be used as a viable, stable neural network framework, with C++ export capabilities.
6. Hyper-param tweaking—Retraining of a few permutations to find best hyper-parameters to achieve highest success ratio.
7. Expand Ground Truth database—Significantly increasing the number of examples in the ground truth for each type of inclusions.

Throughout the process, images are be classified by a stage I neural network system. A human, experienced gemologist confirms and/or corrects the classifications. A human, experienced gemologist also uses the segmentation tool to confirm and/or correct each artifact in each image. At first, a few hundred ground truth example for each type of artifacts are required. The process of expanding the database and re-training the system occurs again when the database exceeds 10,000 ground truth samples for each artifact.

Playbook Examples

Examples of rules defined by the playbook are shown in the Appendix.

Polish Grading

The process of polish grading includes the following elements:

1. Neural network—Preliminary stage
   a. Ground Truth Data: Collect samples of stones and their polish grade as given by a Grading Lab (GIA/HRD, EGL, IGI, etc.) or an expert Gemologist. The methodology includes scanning a gem using the workflow described in the details below. The scan images all facets of the gem. The system is also used to log gem characteristics and the polish grade given by the lab gemologist.
   b. Pre-Trained Neural Network: The first stage is to use a pre-trained neural network that was trained to analyze a collection of images and predict an overall conclusion. This neural network provides a benchmark for efficiency.
   c. Large Database: Measure a large number of examples, a few thousands stones with different polish grade and different external characteristic. This data is used to train the system and increase its efficiency.
   d. Steady State: The data regarding the gems that are measured and graded by the system may be used to enlarge the database and to improve the accuracy of the system over time. The database may rely on samples measured on multiple systems.
2. Log External Stone Parameters
   a. Color Grade
   b. Clarity Grade
   c. Carat Weight
   d. Fluorescence
   e. Shape
3. Measure—The gem holder hides one part of the gem and exposes the other side. This process measures only the part that is exposed (Either crown-side or pavilion-side)
4. 3D model—calculate a 3D model of the part that was measured. Process includes transformation from silhouettes to 3D model.
5. Method for accurate 3D model correction:
   a. Extra facets—Detect extra facets that were not detected by first stage 3D modeling and add them to the model.
   b. Facet fine tuning—Correct the 3D positioning of the facet (rotational angle, tilt, depth).
6. Imaging Facets—Iterate all facets detected in the first stage 3D model and image the facet.
7. Classification and Segmentation of each facet 8. Log facet external data
   a. Part of stone (Crown/Pavilion)
   b. Belt
   c. 3D Position
   d. 2D Polygon
9. Crown/Pavilion—repeat steps 1-7 for
   a. Crown+Table
   b. Pavilion+Culet
   c. Girdle
10. Predict Polish Grade—Use the pre-trained neural network to predict the polish grade of the finished gem.

Figure 22:
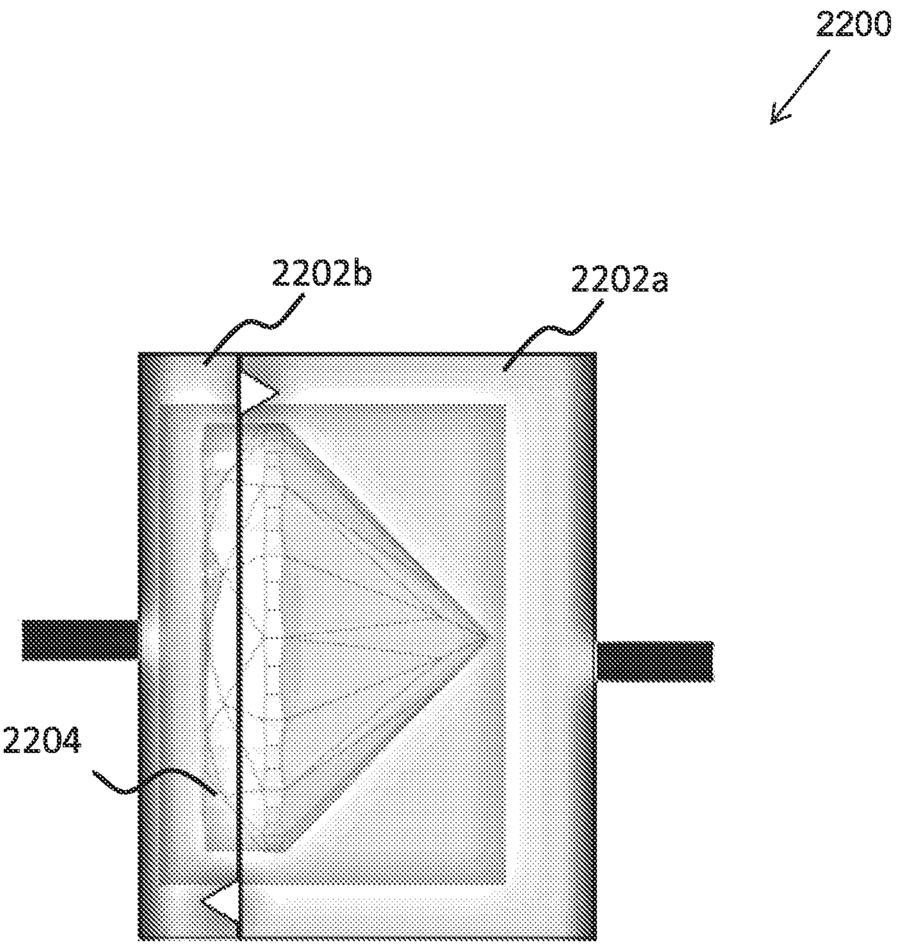
FIG. 22 is a schematic illustration of dual gem holders for automated polishing and grading of gems, according to some embodiments of the present invention.

FIG. 22 is a schematic illustration of a dual gem holder mechanism 2200 for automated polishing and grading of gems, according to some embodiments of the present invention. The robotic apparatus may be configured to include the dual holder mechanism, including sections 2202*a* and 2202*b*, such that gem 2204 may be transferred automatically from one section to the other, enabling a new side to be exposed automatically, thereby overcoming the need for manual intervention.

All or part of the process 1100, as implemented by the computer 22, can be implemented in digital electronic circuitry, or in computer hardware, firmware, software, or in combinations thereof. All or part of the system and process can be implemented as a computer program product, tangibly embodied in an information carrier, such as a machine-readable storage device or in a propagated signal, for execution by, or to control the operation of, data processing apparatus, such as a programmable processor, computer, or deployed to be executed on multiple computers at one website or distributed across multiple websites. Memory storage may also include multiple distributed memory units, including one or more types of storage media. Examples of storage media include, but are not limited to, magnetic media, optical media, and integrated circuits such as read-only memory devices (ROM) and random access memory (RAM). A computing system configured to implement the system may have one or more processors and one or more network interface modules. Processors may be configured as a multi-processing or distributed processing system. Network interface modules may control the sending and receiving of data packets over networks.

It is to be understood that the scope of the present invention includes variations and modifications thereof which would occur to persons skilled in the art upon reading the foregoing description and which are not disclosed in the prior art.

| # | Use Case | Description | Possible Cause | | Polishing Track | Polishing Paste | Presure/ Load | Facet Rotation Angle | Polishing Velocity | Polishing Duration | Polishing Movement Frequency |
|---|---|---|---|---|---|---|---|---|---|---|---|
| 1 | Scratches | Transparent looking white line on the diamond's surface | Faulty track or lack of smoothing material on the track | Polish | Change Polishing Track | Apply | Decrease | — | Decrease | — | Increase |
| 2 | Pits/ Holes | A small opening. | Inclusions falling out of their pockets during polishing | Safety | Change to a smooth track | — | Decrease | — | Decrease | Decrease | — |
| 3 | Lizard Skin | Bumpy looking texture on a diamond's surface | Usually caused by polishing a facet off grain at the hardest direction near a cleavage plain | Polish | Change to a smooth track | — | — | Look for the 2nd best alternative | — | Decrease | — |
| 4 | Burning Marks | A layer of whitish haze | Typically caused by high temperatures from the polishing wheel | Polish | Change to a smooth track | Apply | Decrease | Look for the 2nd best alternative | Decrease | Decrease | Decrease |
| 5 | Abrasion | An area of minute scratches or pits along a facet edge producing a fuzzy white line instead of a sharp facet junction | Typically occurs when a long edge is perpendicular to the rotation direction of the wheel or when the track is too rough | Polish & Safety | Change to a smooth track | — | — | Look for the 2nd best alternative | Decrease | Decrease | Decrease |
| 6 | Polishing Lines | Parallel lines left by the polishing process; may appear white (Wht) or transparent (TP) | Typicaly caused by a rough track | Polish | Change to a smooth track | Apply | — | — | — | Decrease | Increase |
| 7 | Cracks | A narrow opening on the surface of the facet. | Typically comes from natural cracks within the rough | Safety | Change to a smooth track | — | Decrease | — | — | Decrease | Decrease |

The invention claimed is:

1. An automated gem polishing system comprising:

a computer-controlled polishing wheel;

a robotic apparatus, comprising multiple axis controllers and a gem holder;

a digital microscope; and a computer having a processor and a memory, the memory including instructions that when executed by the processor implement steps of registering and polishing a gem in the gem holder by:

operating the robotic apparatus to move the gem to a field of view (FOV) of the digital microscope, to position the gem in multiple views with respect to the digital microscope, and to receive from the digital microscope multiple respective images of the gem;

generating from the multiple respective images a current 3D model of the gem;

registering coordinates of the current 3D model with a target 3D model of a finished gem;

selecting a current facet of the gem to polish in order to achieve the target 3D model;

determining an optimal polishing direction of the current facet; and operating the robotic apparatus to move the current facet into contact with the polishing wheel, and operating the polishing wheel to polish the current facet, in the optimal polishing direction;

wherein the gem has a crystal structure defined by three orthogonal crystallographic axes, wherein said optimal polishing direction is one of said three crystallographic axes or a projection thereof onto said current facet, and wherein said robotic apparatus is configured to rotate said current facet on the polishing wheel into said optimal polishing direction.

2. The system of claim 1, wherein the polishing wheel has an adjustable, computer-controlled speed.

3. The system of claim 1, wherein said determining said optimal polishing direction of the current facet is based on previously determined polishing directions of other facets.

4. The system of claim 1, wherein registering coordinates of the 3D model of the gem with a target 3D model further comprises registering the current 3D model of the gem with respect to a known position of the holder.

5. The system of claim 1, wherein operating the polishing wheel to polish the current facet comprises operating the polishing wheel at a speed and duration determined by predefined rules.

6. The system of claim 5, wherein a selection of the predefined rules is determined according to artifacts on the current facet.

7. The system of claim 1, wherein operating the robotic apparatus to move the current facet to contact the polishing wheel further comprises operating the robotic apparatus to position the current facet in contact with the polishing wheel on a polishing wheel track and at a pressure determined by predefined rules.

8. The system of claim 1, wherein the instructions also cause the processor to select at least one of a polishing speeds, duration, track and pressure according to said optimal polishing direction of the current facet.

9. The system of claim 1, wherein the instructions also cause the processor to select at least one of a polishing speed, duration, track and pressure according to artifacts determined by analyzing an image of the polished surface after a polishing interval.

10. The system of claim 1, wherein the instructions also cause the processor to grade the gem by analyzing an image received from the digital microscope after a polishing interval.

11. The automated gem polishing system of claim 10, wherein the instructions to cause the processor to grade the gem include: to move the gem to the FOV of the digital microscope;

to receive an image corresponding to a view of the current facet recorded by the digital microscope;

to register the image corresponding to said view of the current facet to said current 3D model to determine a depth of polishing, wherein the current 3D model is registered to said target 3D model and to responsively determine that dimensions of the gem equal the dimensions of the target 3D model and that the polishing of the gem is complete;

to position the gem in multiple views with respect to the digital microscope, to receive from the digital microscope multiple respective images of multiple facets of the gem;

to responsively determine, for each of the multiple facets, artifacts of the multiple facets; and to grade the gem by determining a polish grade of the gem according to preset correlations between facet artifacts and polish grades.

12. The system of claim 1, wherein the instructions also cause the processor to operate the robotic apparatus to move the current facet after polishing to said field of view of the digital microscope;

to optically determine a tilt of the gem holder, responsively adjusting the tilt;

to subsequently generate a 2D image of the current facet; and to responsively create a new current 3D model having a new facet conforming to dimensions of the 2D image of the facet.

13. The system of claim 12, wherein the instructions also cause the processor to classify an artifact appearing in the 2D facet image, and, responsively to the artifact classification and the new current 3D model, to determine one or more control settings of the robotic apparatus for further polishing of the facet, wherein the control settings include holder tilt, polishing speed, duration, track and pressure.

14. The system of claim 1, wherein moving the gem to the field of view (FOV) of the digital microscope comprises automatically selecting a lens of the digital microscope according to a size of the gem.

15. The automated gem polishing system according to claim 1, wherein the memory also includes instructions that when executed by the processor implement steps of selecting polishing parameters of the gem in the gem holder by:

operating the robotic apparatus to move the gem to the FOV of the digital microscope;

receiving an image corresponding to a view of said current facet from the digital microscope;

processing the image corresponding to said view of said current facet by an artifact recognition algorithm trained to recognize a set of surface artifacts correlated to a set of subsequent polishing parameters;

identifying at least one surface artifact of said current facet and determining that no correlated set of polishing parameters exists;

issuing an alert to a human operator to determine a set of polishing parameters.

16. The automated gem polishing system of claim 1, wherein the memory also includes instructions that when executed by the processor implement steps of controlling the polishing wheel, the robotic apparatus, and the digital microscope to determine a polish status of the gem in the gem holder by:

operating the robotic apparatus to move said current facet of the gem into contact with the polishing wheel, and operating the polishing wheel to polish the current facet according to a set of polishing parameters;

subsequently moving the gem to the FOV of the digital microscope;

receiving an image corresponding to a view of the current facet recorded by the digital microscope;

registering the image corresponding to said view of the current facet to said current 3D model to determine a depth of polishing;

responsively determining that dimensions of the gem equal the dimensions of the target 3D model and that the polishing of the gem is complete.

* * * * *